US008767872B2

(12) United States Patent
Xu et al.

(10) Patent No.: US 8,767,872 B2
(45) Date of Patent: Jul. 1, 2014

(54) PILOT STRUCTURES FOR ACK AND CQI IN A WIRELESS COMMUNICATION SYSTEM

(75) Inventors: Hao Xu, San Diego, CA (US); Durga Prasad Malladi, San Diego, CA (US); Rachel Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1197 days.

(21) Appl. No.: 12/117,585

(22) Filed: May 8, 2008

(65) Prior Publication Data

US 2008/0298502 A1 Dec. 4, 2008

Related U.S. Application Data

(60) Provisional application No. 60/938,995, filed on May 18, 2007.

(51) Int. Cl.
*H04L 27/00* (2006.01)

(52) U.S. Cl.
USPC .......................................... 375/299; 375/295

(58) Field of Classification Search
USPC .................................. 375/299, 295
See application file for complete search history.

(56) References Cited

U.S. PATENT DOCUMENTS

| 5,579,321 | A | 11/1996 | Van Grinsven et al. | |
|---|---|---|---|---|
| 6,038,263 | A | * 3/2000 | Kotzin et al. | 375/299 |
| 7,492,788 | B2 | 2/2009 | Zhang et al. | |
| 2002/0012385 | A1 * | 1/2002 | Yun et al. | 375/146 |

| 2002/0085619 | A1 | 7/2002 | Cho et al. |
|---|---|---|---|
| 2004/0110473 | A1 | 6/2004 | Rudolf et al. |
| 2004/0180686 | A1 | 9/2004 | Nakayama |

(Continued)

FOREIGN PATENT DOCUMENTS

| CN | 1394392 A | 1/2003 |
|---|---|---|
| CN | 1703034 A | 11/2005 |

(Continued)

OTHER PUBLICATIONS

Qualcomm Europe: "Joint Coding with CQI and ACK and Performance Evaluation" 3GPP Draft; R1-071811, 3RD Generation Partnership Project (3GPP), Mobile Competence Centre; 650, Route Des Luciole ; F-06921 Sophia-Antipolis Cedex; France, vol. tsg_ran\WG1_RL1\TSGR1_48b\Docs, No. St. Julian; 20070326, Mar. 29, 2007, XP050105720 p. 1, lines 15,20-22, p. 2, lines 3-12,22,23, p. 3, lines 10-15, p. 4, lines 14,18-20, figures 3,4 p. 6, lines 2-9.

(Continued)

*Primary Examiner* — Michael Neff

(57) ABSTRACT

Techniques for transmitting data and pilot for control information are described. In one aspect, a user equipment (UE) may spread a reference signal sequence with a first orthogonal sequence to obtain multiple pilot sequences. The UE may then send the multiple pilot sequences on multiple subcarriers in multiple symbol periods, one pilot sequence in each symbol period. The UE may modulate the reference signal sequence with control information (e.g., ACK information) to obtain a modulated sequence. The UE may spread the modulated sequence with a second orthogonal sequence to obtain multiple data sequences. The UE may then send the multiple data sequences on the multiple subcarrier in multiple symbol periods for data. In another aspect, the UE may send multiple pilot sequences on multiple subcarriers in multiple symbol periods separated by at least one symbol period, one pilot sequence in each symbol period.

27 Claims, 14 Drawing Sheets

(56) References Cited

U.S. PATENT DOCUMENTS

| | | | |
|---|---|---|---|
| 2005/0068931 A1* | 3/2005 | Cho et al. | 370/345 |
| 2005/0163265 A1* | 7/2005 | Gupta | 375/343 |
| 2005/0283687 A1 | 12/2005 | Sutivong et al. | |
| 2006/0285601 A1 | 12/2006 | Julian et al. | |
| 2007/0183386 A1* | 8/2007 | Muharemovic et al. | 370/344 |
| 2008/0165891 A1* | 7/2008 | Budianu et al. | 375/299 |
| 2008/0279170 A1* | 11/2008 | Malladi et al. | 370/343 |
| 2008/0287155 A1 | 11/2008 | Xu et al. | |

FOREIGN PATENT DOCUMENTS

| | | |
|---|---|---|
| TW | 200518496 | 6/2005 |
| TW | 200627828 | 8/2006 |
| TW | 200709601 | 3/2007 |
| WO | 2006007316 | 1/2006 |
| WO | WO2006130742 | 12/2006 |
| WO | WO2007087602 A2 | 8/2007 |
| WO | WO2008041080 | 4/2008 |
| WO | WO2008137963 | 11/2008 |

OTHER PUBLICATIONS

Technical Specification Group Radio Access Network: "3GPP TS 36.300-VI.0.0: Evolved Universal Terrestrial Radio Access (E-UTRA) and Evolved Universal Terrestrial Radio Access Network (E-UTRAN); Overall Description; Stage 2 (Release 8)" 3rd Generation Partnership Project (3GPP); Technicalspecification (TS), XX, XX, vol. 36.300, No. 1.0.0, Mar. 1, 2007, pp. 1-42, XP002447408 paragraphs [05.2], [5.3.1], [5.4.2].

"3GPP TR 25.814 V7.1.0, Technical Report, 3rd Generation Partnership Project; Technical Specification Group Radio Access Network; Physical layer aspects for evolved Universal Terrestrial Radio Access (UTRA) (Release 7)" Sep. 1, 2006, XP002511692 Retrieved from the Internet: URL:http://www.3gpp.org/ftp/Specs/archive/25_series/25.814/25814-710.zip>; [retrieved on Jan. 22, 2009].

Qualcomm Europe: "Proposed Structure for UL ACK and CQI" 36PP Draft; RI-070437, 3rd Generation Partnership Project (3GPP), Mobile Competence Centre ; 650, Route Des Lucioles ; F-06921 Sophia-Antipolis Cedex ; France, vol. tsg_ranWGI_RLITSGRI_47bisDocs, No. Sorrento, Italy; 20070115, Jan. 9, 2007, XP050104468 paragraph [0001].

ETRI: Cyclic-shift hopping for uplink sounding reference signalll 3GPP TSG RAN WG1 Meeting #478IS, vol. R1-070213, Jan. 15, 2007, XP002482750 Sorrento, Italy.

"International Search Report and Written Opinion—PCT/US2008/063651, International Search Authority—European Patent Office—Mar. 2, 2009.".

European Search Report—EP11006883—Search Authority—Hague—Sep. 26, 2011.

Qualcomm Incorporated, "ACK/NAK Powers", C30-20020307-008 QCOM ACK NAK Power.doc, Mar. 7, 2002, http://ftp.3gpp2.org/TSGC/working/2002/TSG-C-0203/TSG-C_2002_03_Kobe/WG3/WG 3 Conference Call 2002.03.07/C30-20020307-008 QCOM ACK NAK Power.doc.

Taiwan Search Report—TW097118222—TIPO—Jan. 26, 2012.

Alcatel-Lucent, "Multiplexing Method for Uplink Non-Data-Associated Control Signals",3GPP TSG-RAN WG1 #48bis,Mar. 30, 2007,pp. 1/6-6/6,R1-071719.

Qualcomm Europe: "Pucch (CQI) Structure and Multiplexing" 3GPP Draft; R1-072036, 3rd Generation Partnership Project (3GPP), Mobile Competence Centre ; 650, Route Des Lucioles ; F-06921 Sophia-Antipolis Cedex ; France, vol. tsg_ran\WG1_RL1\TSGR1_49\Docs, No. Kobe, Japan; 20070507, Mar. 7, 2007, XP050105791, Section 2.

Qualcomm Europe, "RS structure for UL ACK transmission", 3GPP TSG RAN WG1#49,May 11, 2007,pp. 1-10,R1-072029.

Qualcomm Europe,"Cyclic Shift Hopping and Link Performance of UL ACK and CQI Channels", 3GPP TSG RAN #48,Feb. 16, 2007,pp. 1-8,R1-070661.

Qualcomm Europe,"RS structure for CQI transmission",3GPP TSG RAN WG1 #49,May 11, 2007,pp. 1-5, R1-072030.

3GPP TR 25.814 V7.1.0, Technical Report, "3rd Generation Partnership Project, Technical Specification Group Radio Access Network, Physical layer aspects for evolved Universal Terrestrial Radio Access (UTRA) (Release 7)", 3GPP TR 25.814 V7.1.0, [Online] vol. 25.814, No. V7.1.0, Sep. 1, 2006, pp. 1-133.

Qualcomm Europe: "Coding Structure for CQI+ACK", 3GPP TSG RAN WG1 #49, May 2, 2007, R1-072037, URL,http://www.3gpp.org/ftp/tsg_ran/WG1_RL1/TSGR1_49/Docs/R1-072037.zip.

Taiwan Search Report—TW097118222—TIPO—Sep. 23, 2013.

* cited by examiner

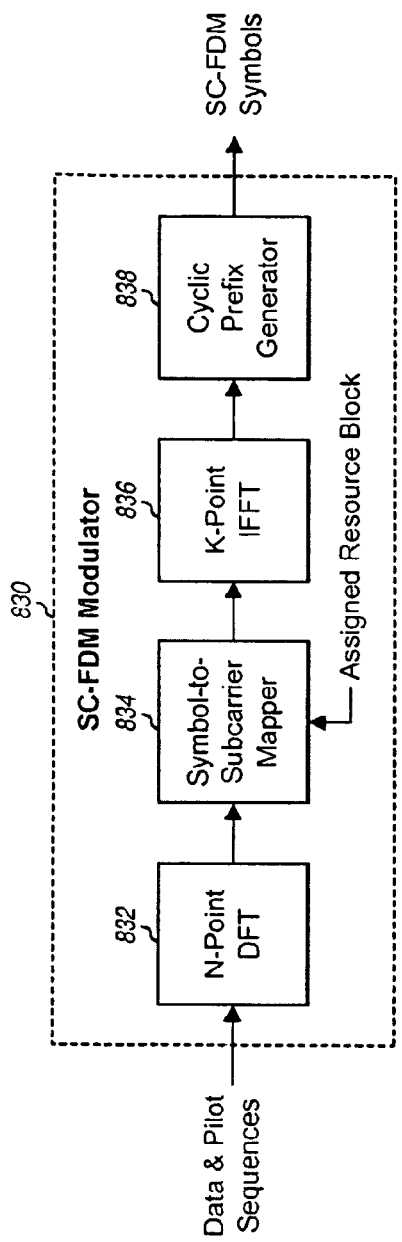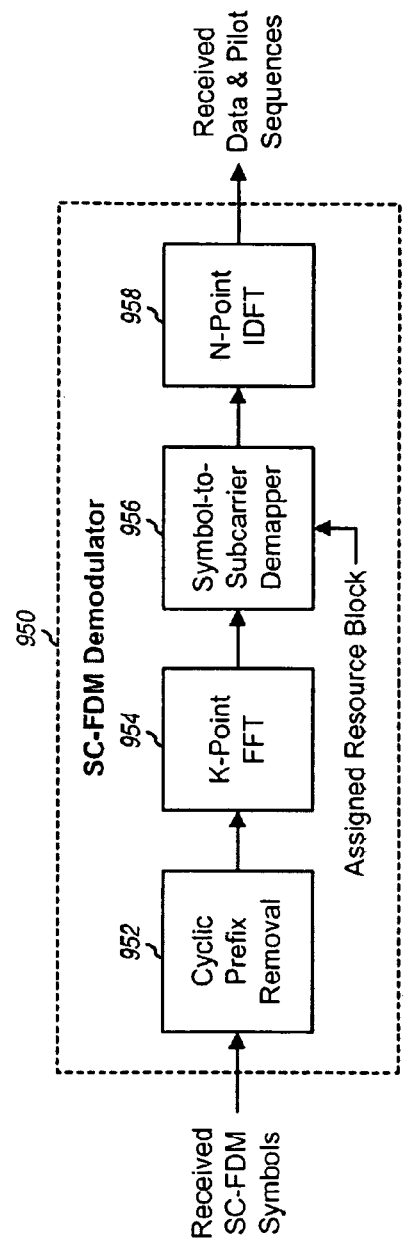
FIG. 8
FIG. 9

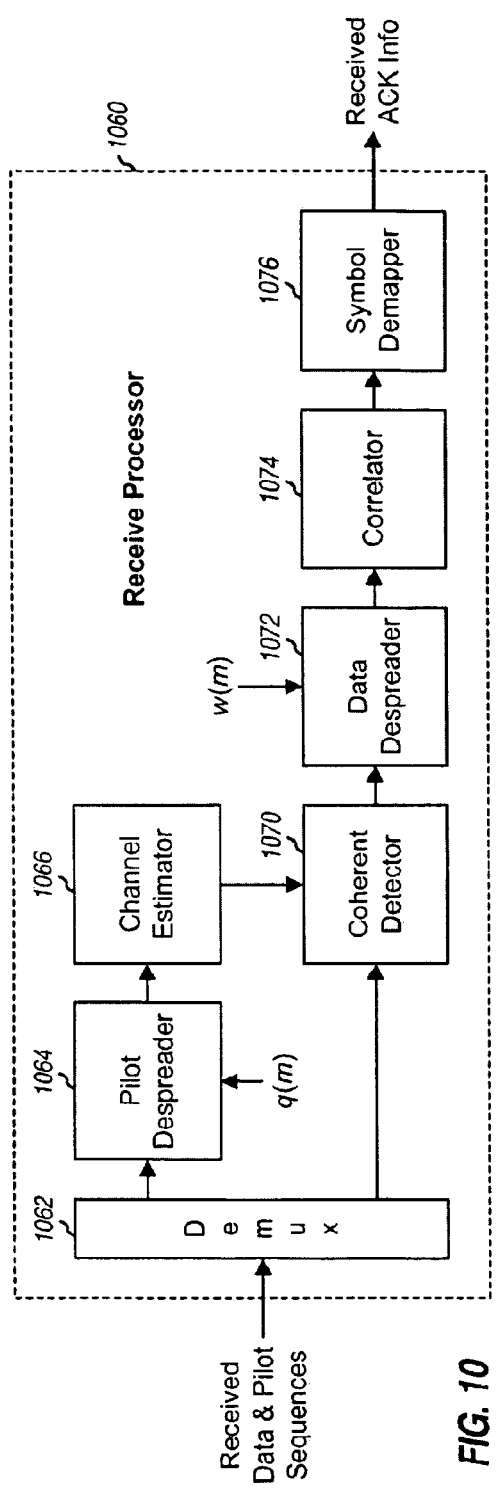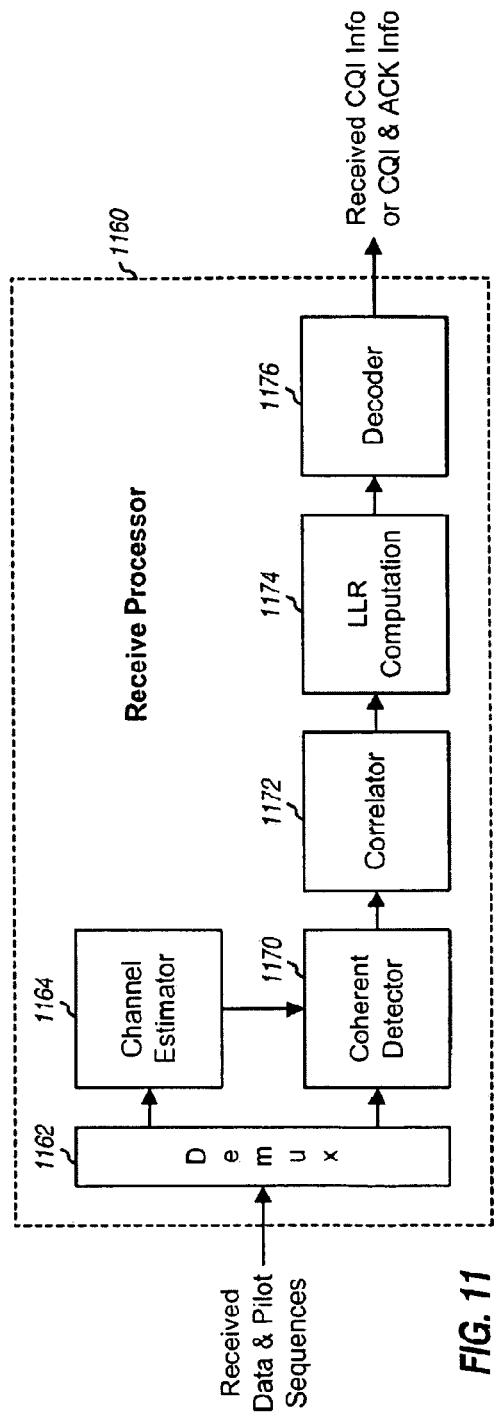

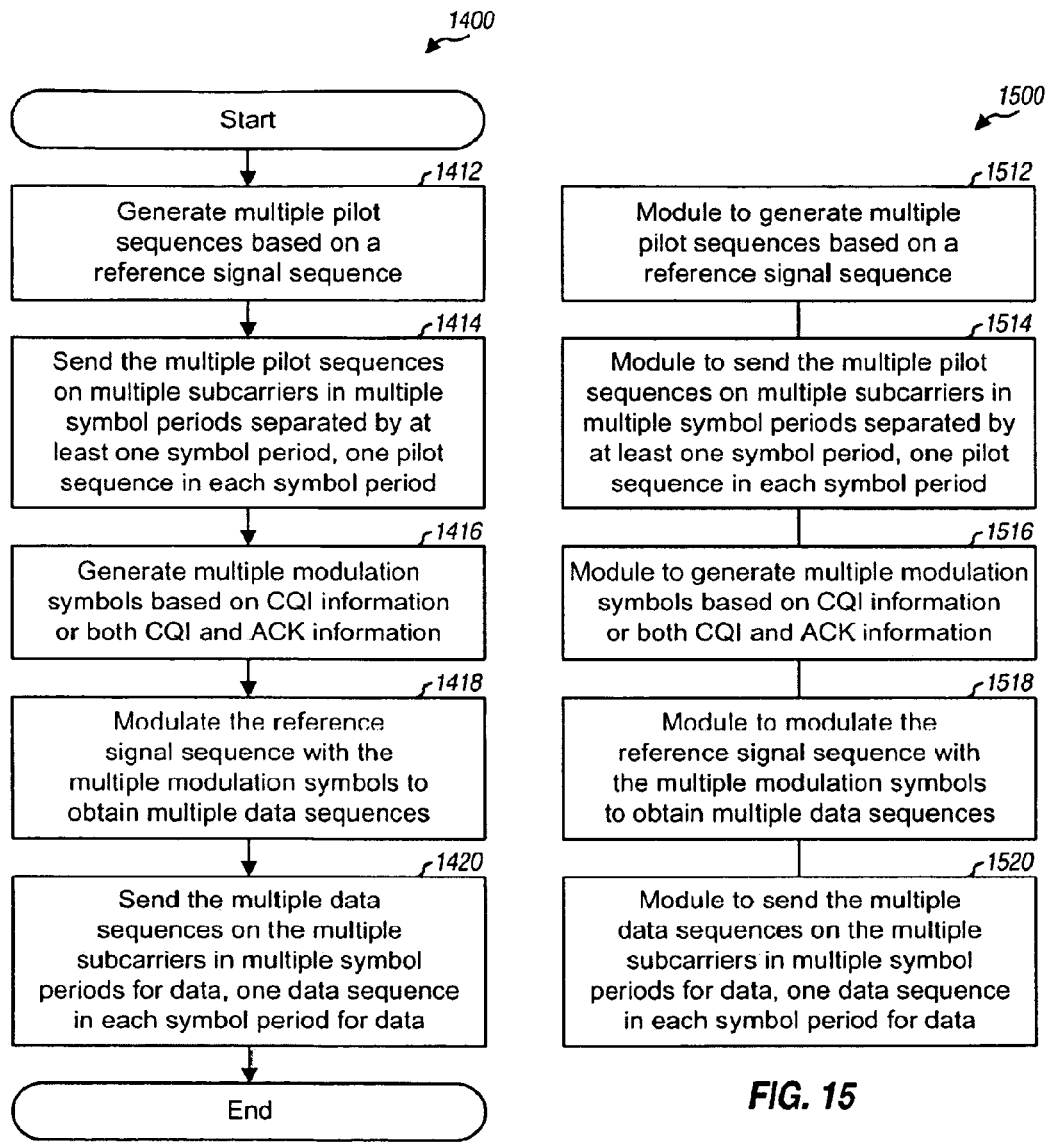

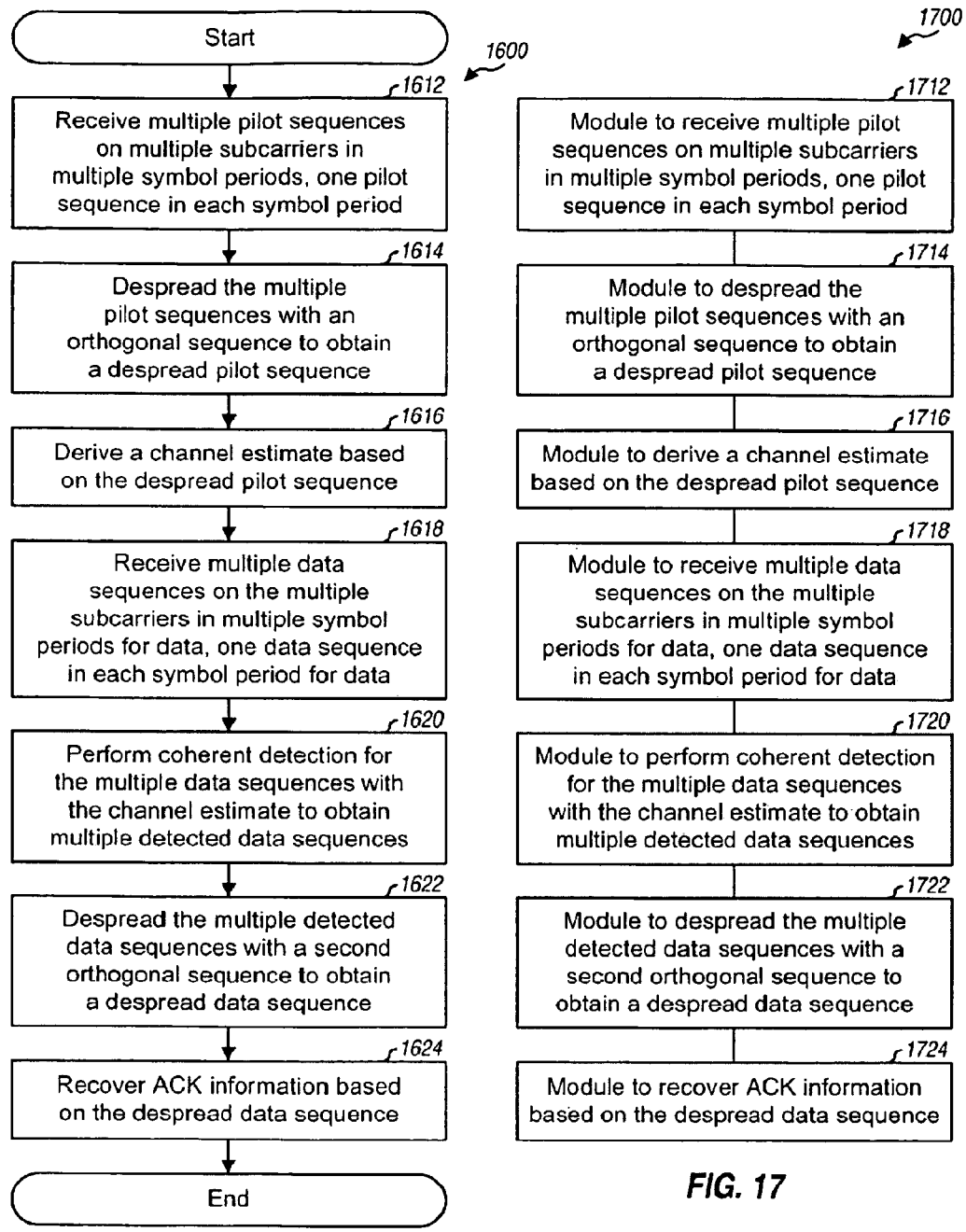

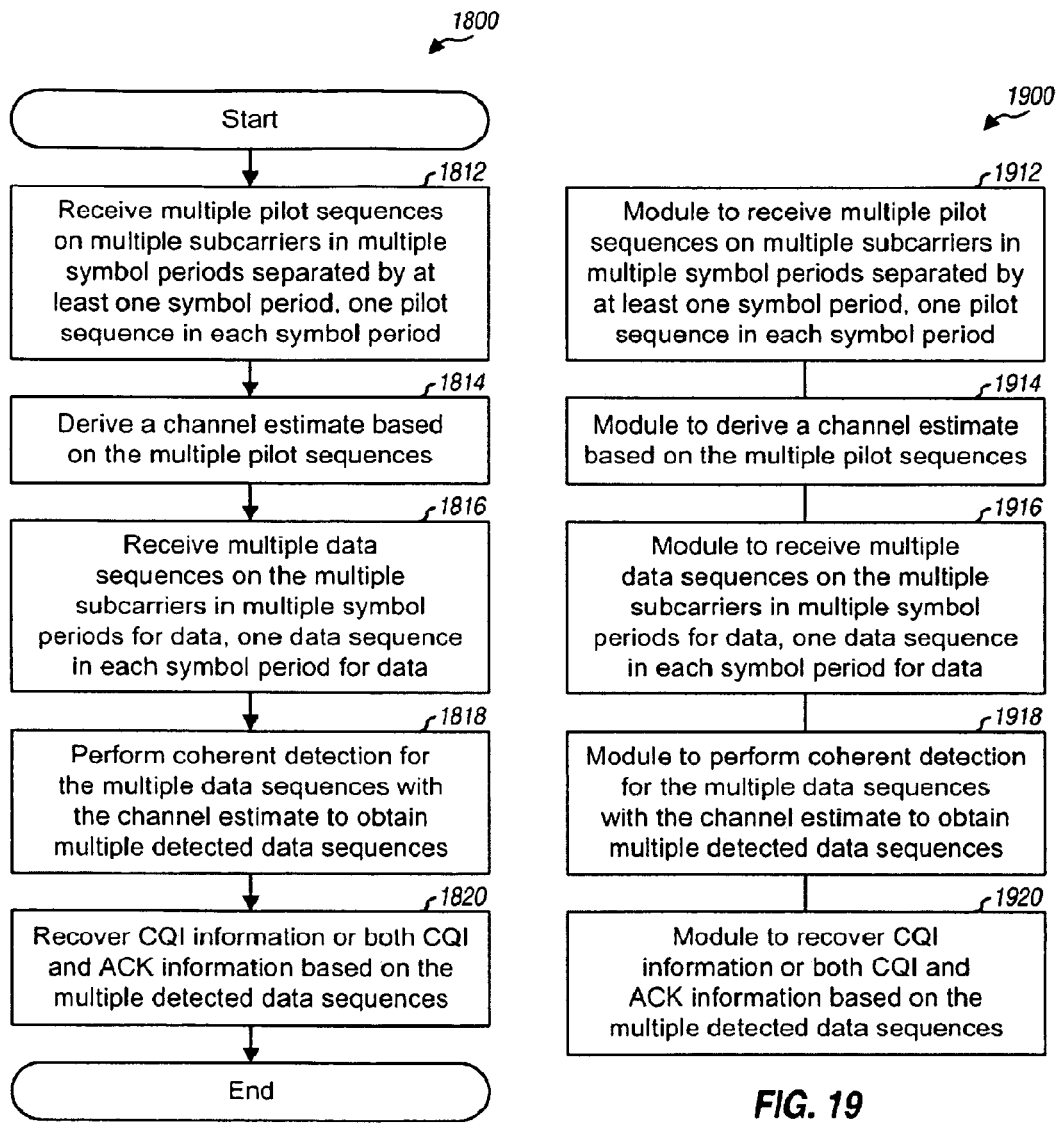

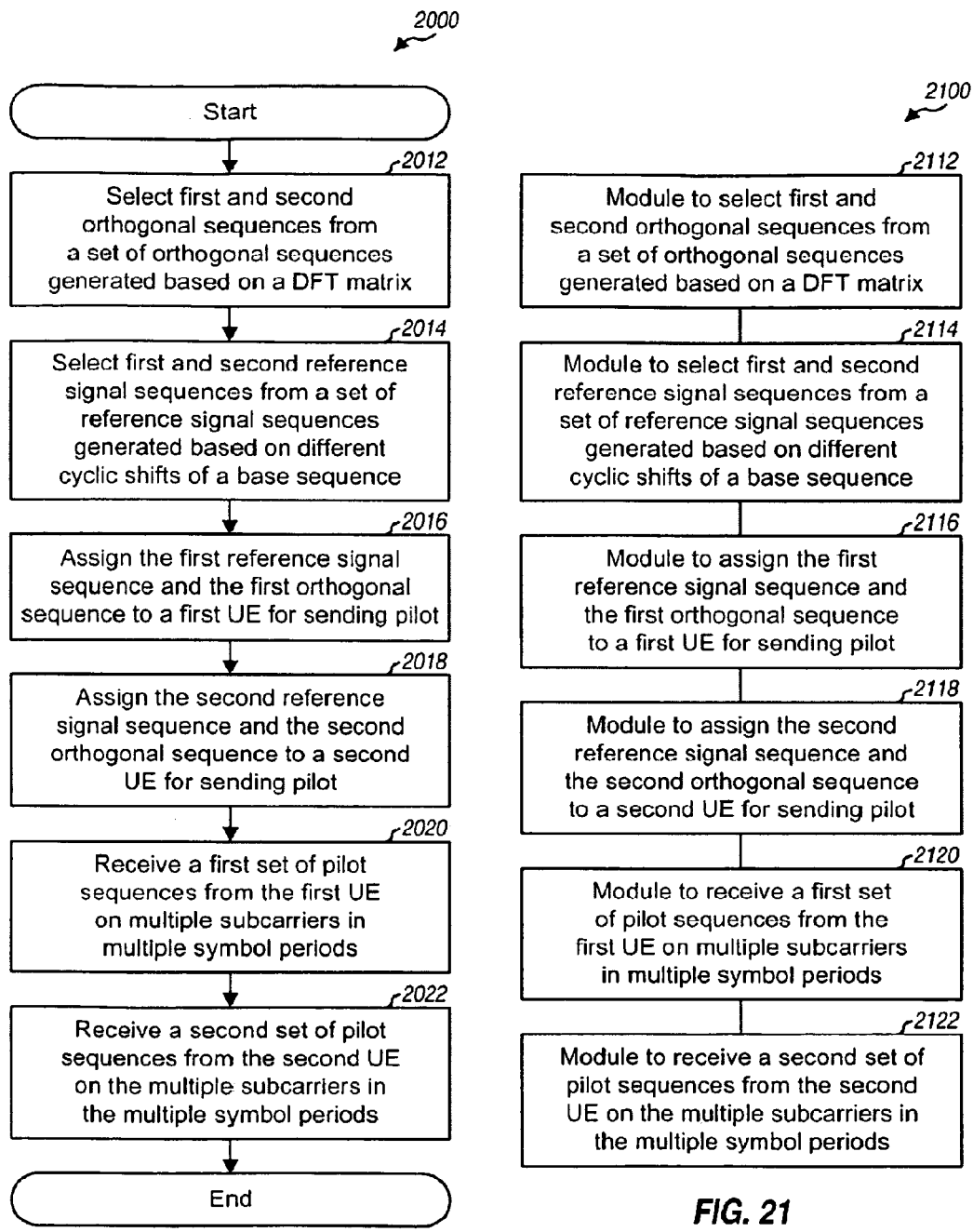

PILOT STRUCTURES FOR ACK AND CQI IN A WIRELESS COMMUNICATION SYSTEM

The present application claims priority to provisional U.S. Application Ser. No. 60/938,995, entitled "A METHOD AND APPARATUS FOR UPLINK CONTROL CHANNEL MULTIPLEXING AND POWER CONTROL," filed May 18, 2007, assigned to the assignee hereof and incorporated herein by reference.

BACKGROUND

I. Field

The present disclosure relates generally to communication, and more specifically to techniques for transmitting data and pilot for control information in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a wireless communication system, a Node B may transmit traffic data to a user equipment (UE) on the downlink and/or receive traffic data from the UE on the uplink. The downlink (or forward link) refers to the communication link from the Node B to the UE, and the uplink (or reverse link) refers to the communication link from the UE to the Node B. The UE may send channel quality indicator (CQI) information indicative of the downlink channel quality to the Node B. The Node B may select a rate or transport format based on the CQI information and may send traffic data at the selected rate or transport format to the UE. The UE may send acknowledgement (ACK) information for traffic data received from the Node B. The Node B may determine whether to retransmit pending traffic data or to transmit new traffic data to the UE based on the ACK information. It is desirable to reliably send ACK and CQI information in order to achieve good performance.

SUMMARY

Techniques for transmitting data and pilot for ACK, CQI and/or other control information in a wireless communication system are described herein. In an aspect, data and pilot for control information (e.g., ACK information) may be transmitted with both frequency-domain and time-domain code division multiplexing (CDM). In one design, a UE may be assigned a reference signal sequence selected from a set of reference signal sequences generated based on different cyclic shifts of a base sequence. These reference signal sequences have good correlation properties and may be sent simultaneously by different UEs on the same set of subcarriers in the same symbol period. The UE may also be assigned a first orthogonal sequence selected from a set of orthogonal sequences generated based on a discrete Fourier transform (DFT) matrix or a Walsh matrix. The UE may spread the reference signal sequence with the first orthogonal sequence to obtain multiple pilot sequences. The UE may then send the multiple pilot sequences on multiple subcarriers in multiple symbol periods, one pilot sequence in each symbol period. The UE may also be assigned a second orthogonal sequence from a set of orthogonal sequences for data. The UE may modulate the reference signal sequence with ACK information to obtain a modulated sequence. The UE may then spread the modulated sequence with the second orthogonal sequence to obtain multiple data sequences. The UE may send the multiple data sequences on the multiple subcarriers in multiple symbol periods for data.

In another aspect, data and pilot for control information may be transmitted with frequency-domain CDM and pilot distributed across time. In one design, a UE may be assigned a reference signal sequence and may generate multiple pilot sequences based on the reference signal sequence. The UE may send the multiple pilot sequences on multiple subcarriers in multiple symbol periods separated by at least one symbol period, one pilot sequence in each symbol period. The UE may also generate multiple modulation symbols based on control information, e.g., only CQI information or both CQI and ACK information. The UE may modulate the reference signal sequence with the multiple modulation symbols to obtain multiple data sequences. The UL may then send the multiple data sequences on the multiple subcarriers in multiple symbol periods for data, one data sequence in each symbol period for data.

A Node B may receive data and pilot sequences from different UEs and may perform the complementary processing to recover the control information sent by each UE, as described below. Various aspects and features of the disclosure are described in further detail below.

BRIEF DESCRIPTION OF THE DRAWINGS

FIG. 8 shows a block diagram of an SC-FDM modulator.

FIG. 9 shows a block diagram of an SC-FDM demodulator.

FIG. 10 shows a-block diagram of a receive processor for ACK.

FIG. 11 shows a block diagram of a receive processor for CQI.

FIG. 14 shows a process for transmitting data and pilot for CQI.

FIG. 15 shows an apparatus for transmitting data and pilot for CQI.

FIG. 16 shows a process for receiving ACK.

FIG. 17 shows an apparatus for receiving ACK.

FIG. 18 shows a process for receiving CQI.

FIG. 19 shows an apparatus for receiving CQI.

FIG. 20 shows a process for supporting transmission of ACK and CQI.

FIG. 21 shows an apparatus for supporting transmission of ACK and CQI.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

Figure 1:
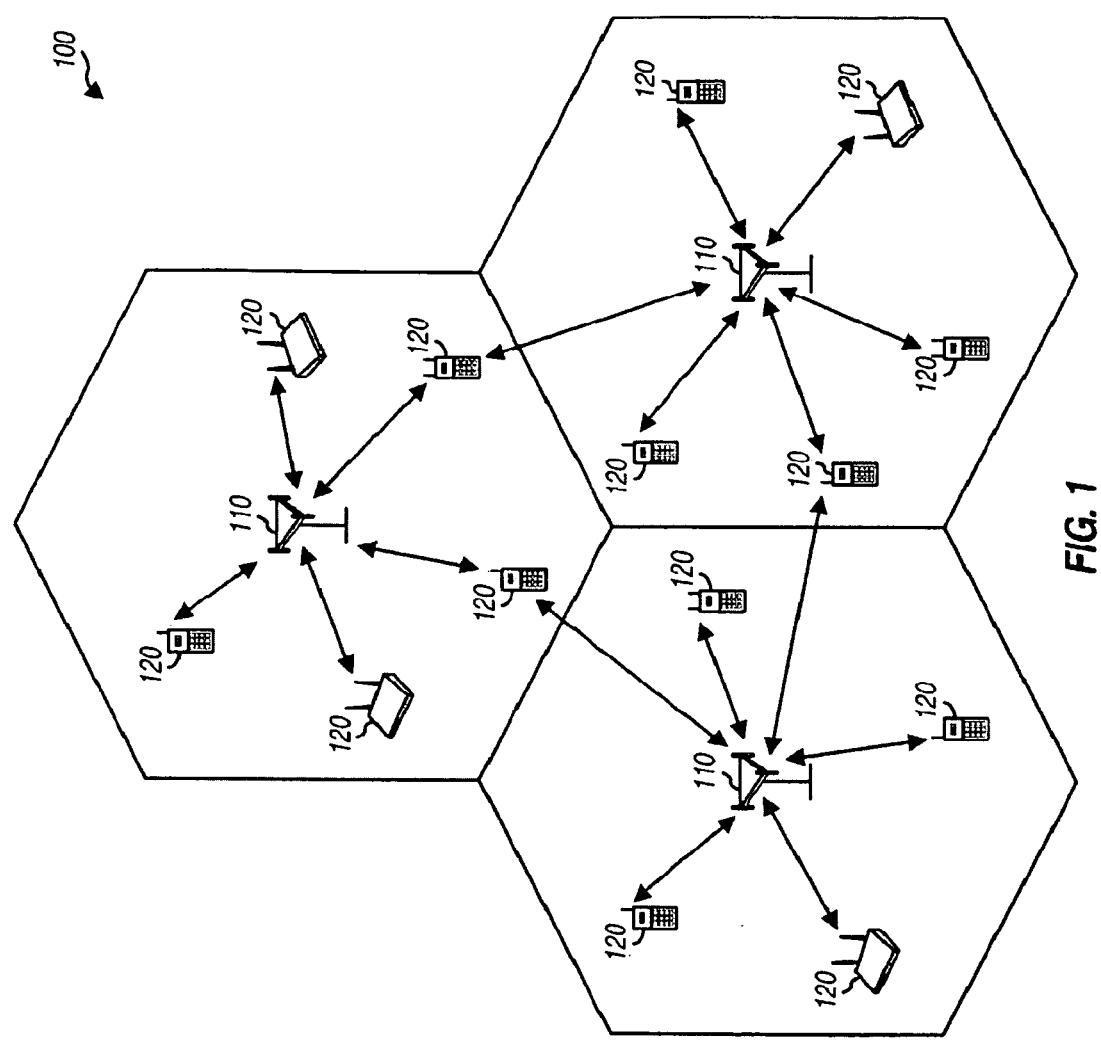
FIG. 1 shows a wireless communication system.

FIG. 1 shows a wireless communication system 100 with multiple Node Bs 110. A Node B may be a fixed station that communicates with the UEs and may also be referred to as an evolved Node B (eNB), a base station, an access point, etc. UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via transmissions on the downlink and uplink.

Figure 2:
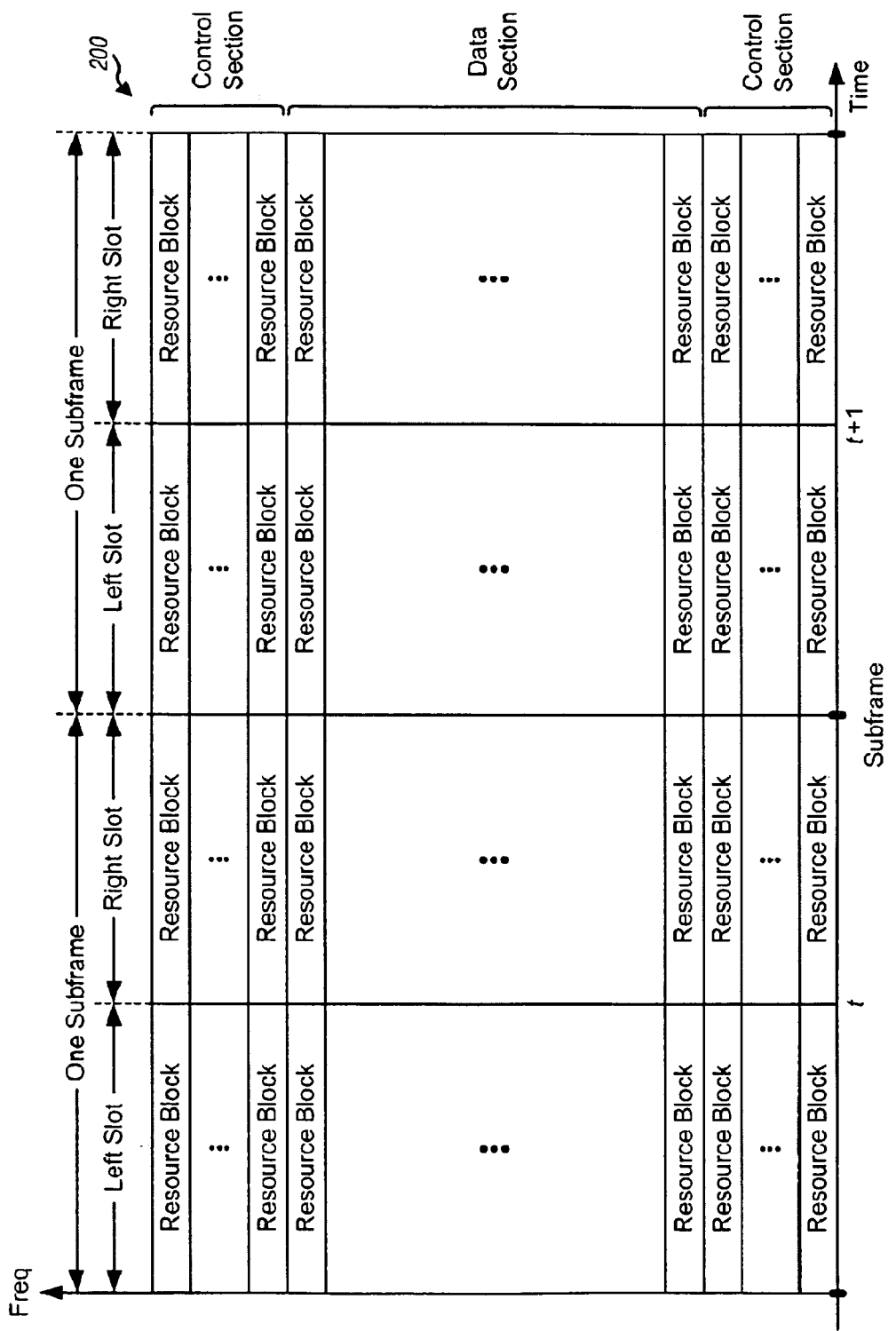
FIG. 2 shows an example transmission structure for the uplink.

FIG. 2 shows a design of a transmission structure 200 that may be used for the uplink. The transmission timeline may be partitioned into units of subframes. A subframe may have a predetermined duration, e.g., one millisecond (ms), and may be partitioned into two slots. Each slot may include a fixed or configurable number of symbol periods, e.g., six symbol periods for an extended cyclic prefix or seven symbol periods for a normal cyclic prefix.

For the uplink, K total subcarriers may be available and may be grouped into resource blocks. Each resource block may include N subcarriers (e.g., N=12 subcarriers) in one slot. The available resource blocks may be divided into a data section and a control section. The control section may be formed at the two edges of the system bandwidth, as shown in FIG. 2. The control section may have a configurable size, which may be selected based on the amount of control information being sent on the uplink by the UEs. The resource blocks in the control section may be assigned to the UEs for transmission of ACK information, CQI information, etc. The data section may include all resource blocks not included in the control section. The design in FIG. 2 results in the data section including contiguous subcarriers, which may then allow a single UE to be assigned all of the contiguous subcarriers in the data section.

A UE may be assigned resource blocks in the control section to transmit ACK and/or CQI information to a Node B. The ACK information may convey whether each transport block sent by the Node B to the UE is decoded correctly or in error by the UE. The amount of ACK information to send by the UE may be dependent on the number of transport blocks sent to the UE. In one design, the ACK information may comprise one or two ACK bits depending on whether one or two transport blocks are sent to the UE. In other designs, the ACK information may comprise more ACK bits.

The CQI information may convey the downlink channel quality estimated by the UE for the Node B. The amount of CQI information to send by the UE may be dependent on various factors such as the number of spatial channels available for downlink transmission, the format for reporting the downlink channel quality, the desired granularity in the reported downlink channel quality, etc. In one design, the CQI information may comprise 8, 9 or 10 bits. In other designs, the CQI information may comprise fewer or inure bits.

The UE may send ACK and/or CQI information on a physical uplink control channel (PUCCH), which may be mapped to resource blocks in the control section. In one design, two PUCCH structures may be supported and are referred to as an ACK structure and a CQI structure. The ACK structure may be used to send only ACK information. The CQI structure may be used to send only CQI information or both ACK and CQI information. The ACK and CQI structures may also be referred to by other names. For example, the ACK structure may also be referred to as PUCCH format 0 or 1 depending on whether 1 or 2 ACK bits are being sent. The CQI structure may also be referred to as PUCCH format 2.

Table 1 lists some characteristics of the ACK and CQI structures in accordance with one design. Table 1 gives the number of symbol periods for data and the number of symbol periods for pilot in one slot of seven symbol periods. Pilot is data that is known a priori by both a transmitter and a receiver and may also be referred to as reference, preamble, etc.

TABLE 1

| PUCCH Structures | | |
|---|---|---|
| | ACK Structure | CQI Structure |
| Number of information bits | 1 or 2 | 8 to 10 |
| Number of symbol periods for data per slot | L = 4 | L = 5 |
| Number of symbol periods for pilot per slot | M = 3 | M = 2 |
| Spreading for data | Yes | No |
| Spreading for pilot | Yes | No |
| Number of channels supported | Up to 18 ACK channels | Up to 6 CQI channels |

Spreading refers to a process of replicating a symbol to obtain multiple copies and then multiplying these copies with an orthogonal sequence to obtain multiple spread symbols. Multiple UEs may concurrently send symbols on the same resources with different orthogonal sequences. A Node B may recover the symbols sent by these UEs by performing the complementary despreading. Spreading is also commonly referred to as covering.

Figure 3A:
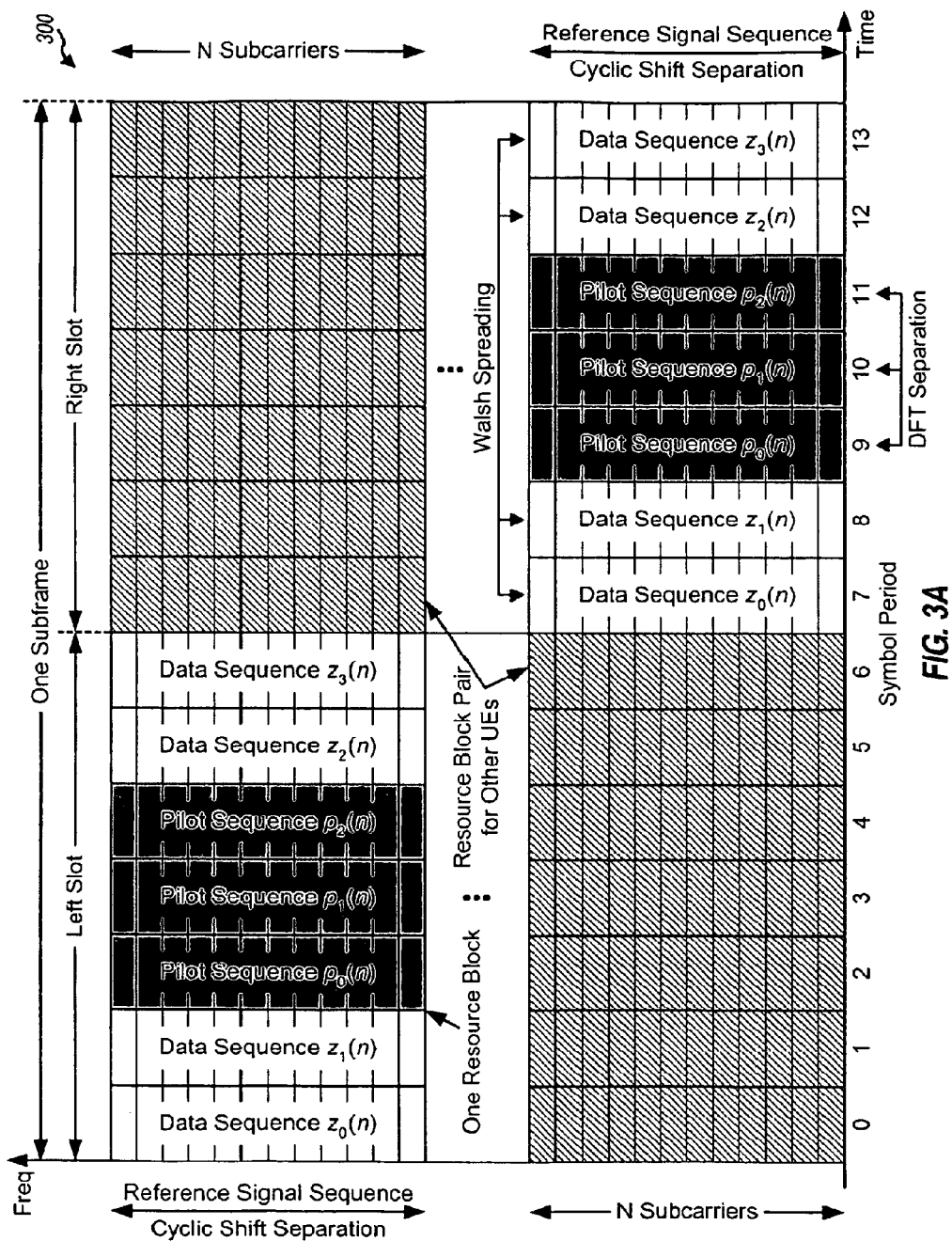
FIGS. 3A and 3B show two designs of an ACK structure.

FIG. 3A shows a design of an ACK structure 300 for a case in which each slot includes seven symbol periods. In each subframe, the loft slot includes seven symbol periods 0 through 6, and the right slot includes seven symbol periods 7 through 13. One or more UEs may concurrently send ACK information on a resource block pair that includes either (i) one resource block in the top control section in the left slot and one resource block in the bottom control section in the right slot, as shown in FIG. 3A, or (ii) one resource block in the bottom control section in the left slot and one resource block in the top control section in the right slot (shown with diagonal hashing in FIG. 3A).

In one design, a resource block for ACK includes four symbol periods for data and three symbol periods for pilot. In the design shown in FIG. 3A, pilot is sent in the middle three symbol periods of the resource block, and data is sent in the remaining four symbol periods. Data and pilot for ACK may also be sent in other symbol periods within the resource block.

In one design, a UE may send data and pilot for ACK using a reference signal sequence having good correlation properties. Different UEs may concurrently send data and pilot for ACK on the same resource block using different reference signal sequences, which may be generated with a base sequence. In one design, the base sequence may be a CAZAC (constant amplitude zero auto correlation) sequence such as a Chu sequence, a Zardoff-Chu sequence, a Frank sequence, a generalized chirp-like (GCL) sequence, etc. In another design, the base sequence may be a sequence defined to have good correlation properties.

In one design, multiple reference signal sequences of length N may be generated with different cyclic shifts of a base sequence of length N, as follows:

$$r_a(n) = r_b((n+\alpha) \bmod N) = e^{j\alpha n} \cdot r_b(n), \text{ for } n=0,\ldots,N-1, \quad \text{Eq (1)}$$

where $r_b(n)$ is the base sequence, with n being a symbol index, $r_a(n)$ is a reference signal sequence with a cyclic shift of $\alpha$, and "mod" denotes a modulo operation.

In one design, N=12 and each reference signal sequence has a length of 12. Six reference signal sequences may be generated with six different values of $\alpha$ and may be assigned to different UEs. Multiple reference signal sequences may also be generated in other manners.

In one design, a UE may use a single reference signal sequence for all symbol periods of a subframe. In another designs the UE may use different reference signal sequences for different symbol periods of the subframe. In yet another design, the UE may use different reference signal sequences for different slots of the subframe. The hopping in the last two designs may randomize interference. For simplicity, the following description assumes that the UE uses a single reference signal sequence tin) for all symbol periods, where $r(n) = r_a(n)$ for a specific value of $\alpha$.

In one design, a UE may spread its pilot for ACK with an orthogonal sequence assigned to the UE. For the design shown in FIG. 3A, an orthogonal sequence of length 3 may be used to send pilot in three symbol periods. In one design, three orthogonal sequences may be defined based on a 3×3 DFT matrix $D_{3\times 3}$ which may be expressed as:

$$D_{3\times 3} = \begin{bmatrix} 1 & 1 & 1 \\ 1 & e^{j2\pi/3} & e^{j4\pi/3} \\ 1 & e^{j4\pi/3} & e^{j2\pi/3} \end{bmatrix}. \quad \text{Eq (2)}$$

Three orthogonal sequences $q_0(r)$, $q_1(m)$ and $q_2(m)$ may be defined with the three rows of the 3×3 DFT matrix and may be given as:

$$q_0(m) = [1\ 1\ 1], \quad \text{Eq (3a)}$$

$$q_1(m) = [1\ e^{j2\pi/3}\ e^{j4\pi/3}], \text{and} \quad \text{Eq (3b)}$$

$$q_2(m) = [1\ e^{j4\pi/3}\ e^{j2\pi/3}], \quad \text{Eq (3c)}$$

where m is an index for symbol period.

In general, the length and the number of orthogonal sequences for pilot may be dependent on the number of symbol periods used for pilot. For example, two orthogonal sequences of length 2 may be used for pilot-sent in two symbol periods, four orthogonal sequences of length 4 may be used for pilot sent in four symbol periods, etc. Different types of orthogonal sequences may be available for different lengths. For example, orthogonal sequences of any length M may be defined based on an M×M DFT matrix whereas orthogonal sequences of length of a power of two (e.g., 2, 4, etc.) may be defined based on a Walsh matrix.

In one design, a UE may generate pilot for ACK as follows:

$$p_m(n) = q(m) \cdot r(n), \text{ for } n=0,\ldots,N-1 \text{ and } m=0,1,2, \quad \text{Eq (4)}$$

where q(m) is an orthogonal sequence for pilot assigned to the UE, and $p_m(n)$ is a pilot sequence for ACK for symbol period m.

The orthogonal sequence q(m) assigned to the UE may be $q_0(m)$, $q_1(m)$ or $q_2(m)$. In the design shown in equation (4), the N symbols in the reference signal sequence r(n) are each multiplied with the first symbol q(0) in the orthogonal sequence to obtain a first pilot sequence $p_0(n)$, with the second symbol q(1) to obtain a second pilot sequence $p_1(n)$, and with the third symbol q(2) to obtain a third pilot sequence $p_2(n)$. The three pilot sequences $p_0(n)$, $p_1(n)$ and $p_2(n)$ may be sent in three symbol periods 2, 3 and 4 in the left slot and also in three symbol periods 9, 10 and 11 in the right slot, as shown in FIG. 3A.

Up to 18 UEs may concurrently send pilots for ACK with six reference signal sequences and three orthogonal sequences $q_0(m)$, $q_1(m)$ and $q_2(m)$. Each UE may send its pilot with a specific reference signal sequence r(n) and a specific orthogonal sequence q(m). The pilots from these UEs may be distinguished by (i) the spreading with the orthogonal sequences in the time domain and (ii) the separation of the reference signal sequences in the frequency domain.

In one design, a UE may spread its data for ACK with an orthogonal sequence assigned to the UE. For the design shown in FIG. 3A, an orthogonal sequence of length 4 may be used to send data in four symbol periods. In one design, four orthogonal sequences may be defined based on a 4×4 Walsh matrix $W_{4\times 4}$, which may be expressed as:

$$W_{4\times 4} = \begin{bmatrix} +1 & +1 & +1 & +1 \\ +1 & -1 & +1 & -1 \\ +1 & +1 & 1 & -1 \\ +1 & -1 & -1 & +1 \end{bmatrix}. \quad \text{Eq (5)}$$

Four orthogonal sequences $w_0(m)$, $w_1(m)$, $w_2(m)$ and $w_3(m)$ may be defined with the four rows of the 4×4 Walsh matrix and may be given as:

$$w_0(m) = [+1+1+1+1], \quad \text{Eq (6a)}$$

$$w_1(m) = [+1-1+1-1], \quad \text{Eq (6b)}$$

$$w_2(m) = [+1+1-1-1], \quad \text{and Eq (6c)}$$

$$w_3(m) = [+1-1-1+1]. \quad \text{Eq (6d)}$$

In general, the length and the number of orthogonal sequences for data may be dependent on the number of symbol periods used for data. For example, three orthogonal sequences, of length 3 may be used for data sent in three symbol periods, etc.

In one design, a UE may process data for ACK as follows. The UE may first map one or two bits for ACK to a modulation symbol d(0) based on BPSK or QPSK, respectively. The UE may then modulate its reference signal sequence r(n) with the modulation symbol d(0), as follows:

$$y(n)=d(0)\cdot r(n), \text{for } n=0,\ldots,N-1, \quad \text{Eq (7)}$$

where y(n) is a modulated sequence for ACK. As shown in equation (7), the same modulation symbol is applied to each of the N symbols in the reference signal sequence.

The UE may then spread the modulated sequence as follows:

$$z_m(n)=w(m)\cdot y(n), \text{for } n=0,\ldots,N-1 \text{ and } m=0,\ldots,3, \quad \text{Eq (8)}$$

where w(m) is an orthogonal sequence for data assigned to the UE, and $z_m(n)$ is a data sequence for ACK for symbol period m.

The orthogonal sequence w(m) assigned to the UE may be $w_0(m)$, $w_1(m)$, $w_2(m)$ or $w_3(m)$. In the design shown in equation (8), the N symbols in the modulated sequence y(n) are each multiplied with the first symbol w(0) in the orthogonal sequence to obtain a first data sequence $z_0(n)$, with the second symbol w(1) to obtain a second data sequence $z_1(n)$, with the third symbol w(2) to obtain a third data sequence $z_2(n)$, and with the fourth symbol w(3) to obtain a fourth data sequence $z_3(n)$. The four data sequences $z_0(n)$, $z_1(n)$, $z_2(n)$ and $z_3(n)$ may be sent in four symbol periods 0, 1, 5 and 6 in the left slot and also in four symbol periods 7, 8, 12 and 13 in the right slot, as shown in FIG. 3A.

Up to 24 UEs may concurrently send data for ACK with six reference signal sequences and four orthogonal sequences $w_0(m)$ to $w_3(m)$. Each UE may send its data with a specific reference signal sequence r(n) and a specific orthogonal sequence w(m). The data from these UEs may be distinguished by (i) the spreading with the orthogonal sequences in the time domain and (ii) the separation of the reference signal sequences in the frequency domain.

In one design, 18 ACK channels may be defined with six reference signal sequences, three orthogonal sequences for pilot, and four orthogonal sequences for data. The number of ACK channels may be limited by the number of UEs that can send pilots concurrently. Each ACK channel may be associated with a specific reference signal sequence r(n), a specific orthogonal sequence q(m) for pilot, and a specific orthogonal sequence w(m) for data. Up to 18 UEs may concurrently send their ACK information on up to 18 ACK channels on the same resource block pair.

Figure 3B:
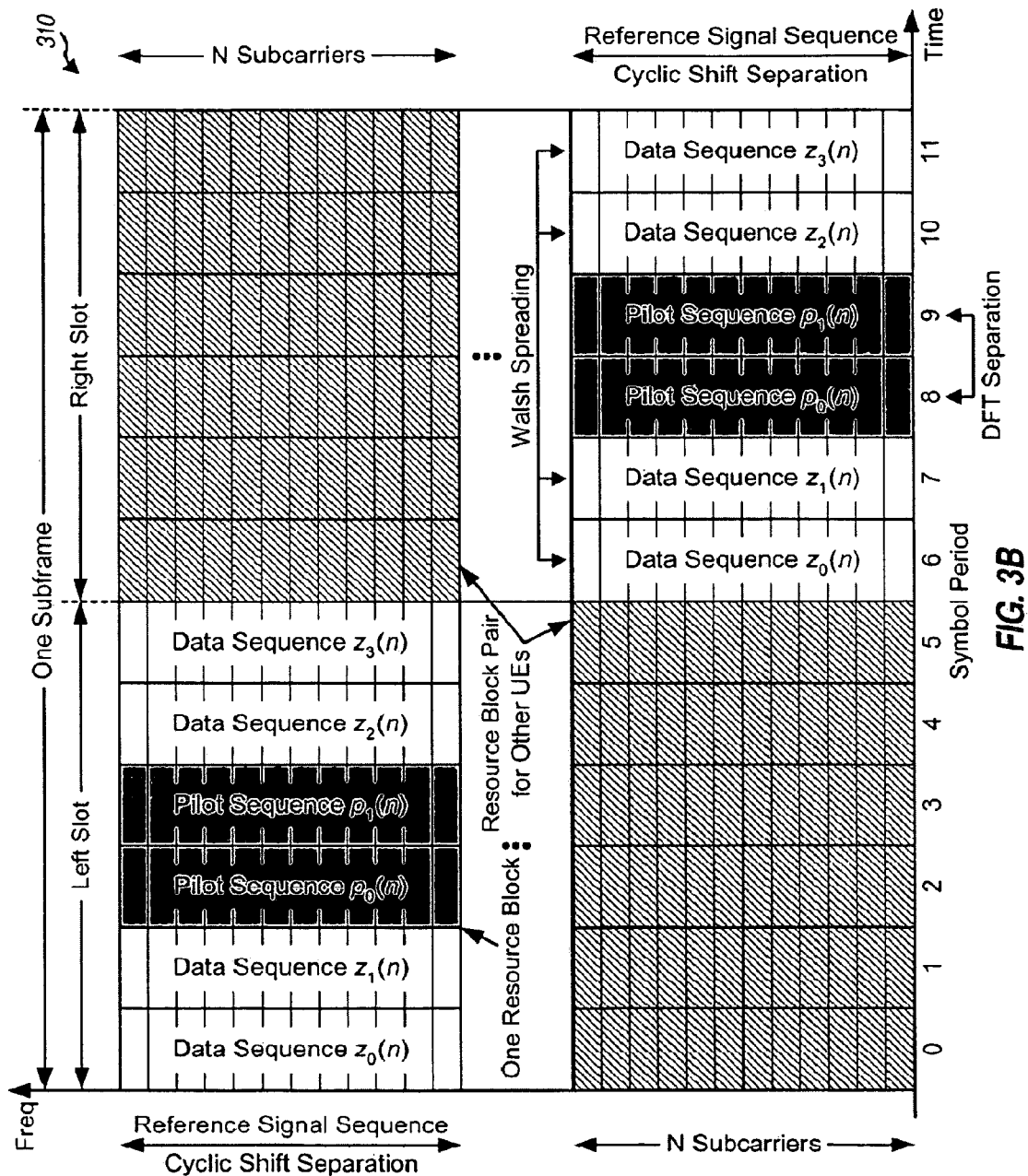

FIG. 3B shows a design of an ACK structure 310 for a case in which each slot includes six symbol periods. In each subframe, the left slot includes six symbol periods 0 through 5, and the right slot includes six symbol periods 6 through 11. In one design, a resource block for ACK includes four symbol periods for data and two symbol periods for pilot. In the design shown in FIG. 3B, pilot is sent in the middle two symbol periods of the resource block, and data is sent in the remaining four symbol periods. Data and pilot for ACK may also be sent in other symbol periods within the resource block.

In one design, two orthogonal sequences of length 2 may be defined for pilot based on a 2×2 DFT matrix $D_{x2}$, which may be expressed as:

$$D_{2\times 2} = \begin{bmatrix} +1 & +1 \\ +1 & -1 \end{bmatrix}. \quad \text{Eq (9)}$$

The 2×2 DFT matrix is equal to a 2×2 Walsh matrix.

Two orthogonal sequences $q_0(m)$ and $q_1(m)$ may be defined with the two rows of the 2×2 DFT matrix and may be given as:

$$q_0(m)=[+1+1], \text{and} \quad \text{Eq (10a)}$$

$$q_1(m)=[+1-1]. \quad \text{Eq (10b)}$$

For the design shown in FIG. 3B, a UE may generate pilot for ACK with an orthogonal sequence q(m) of length 2, as shown in equation (4), to obtain two pilot sequences $p_0(n)$ and $p_1(n)$. The UE may send the two pilot sequences $p_0(n)$ and $p_1(n)$ in two symbol periods 2 and 3 in the left slot and also in two symbol periods 8 and 9 in the right slot, as shown in FIG. 3B. The UE may also process data for ACK with an orthogonal sequence w(m) of length 4, as shown in equations (7) and (8), to obtain four data sequences $z_0(n)$ to $z_3(n)$. The UE may send the four data sequences $z_0(n)$ to $z_3(n)$ in four symbol periods 0, 1, 4 and 5 in the left slot and also in four symbol periods 6, 7, 10 and 11 in the right slot, as shown in FIG. 3B.

For the design shown in FIG. 3B, up to 12 UEs may concurrently send pilots for ACK with six reference signal sequences and two orthogonal sequences $q_0(m)$ and $q_1(m)$. In one design, 12 ACK channels may be defined with six reference signal sequences, two orthogonal sequences for pilot, and four orthogonal sequences for data. The number of ACK channels may be limited by the number of UEs that can send pilots concurrently. Each ACK channel may be associated with a specific reference signal sequence r(n), a specific orthogonal sequence q(m) for pilot, and a specific orthogonal sequence w(m) for data. Up to 12 UEs may concurrently send their ACK information on up to 12 ACK channels on the same resource block pair.

In another design of an ACK structure for slots with six symbol periods, pilot may be sent in three symbol periods in a resource block, and data may be sent in the remaining three symbol periods in the resource block. In this design, orthogonal sequences of length 3 may be used for both pilot and data and may be defined as shown in equation set (3). In this design, 18 ACK channels may be defined with six reference signal sequences, three orthogonal sequences for pilot, and three orthogonal sequences for data. Up to 18 UEs may concurrently send their ACK information on up to 18 ACK channels on the same resource block pair.

Several example designs of the ACK structure have been described above. In general, pilot may be sent in any number of symbol periods (M), and data may be sent in any number of symbol periods (L). A set of orthogonal sequences of length M may be used for pilot, and a set of orthogonal sequences of length L may be used for data. The orthogonal sequences for pilot and data may be defined based on DFT, Walsh and/or other matrices of suitable dimensions. A UE may spread its pilot with an orthogonal sequence q(m) assigned to the UE for pilot and may spread its data with an orthogonal sequence w(m) assigned to the UE for data.

Figure 4:
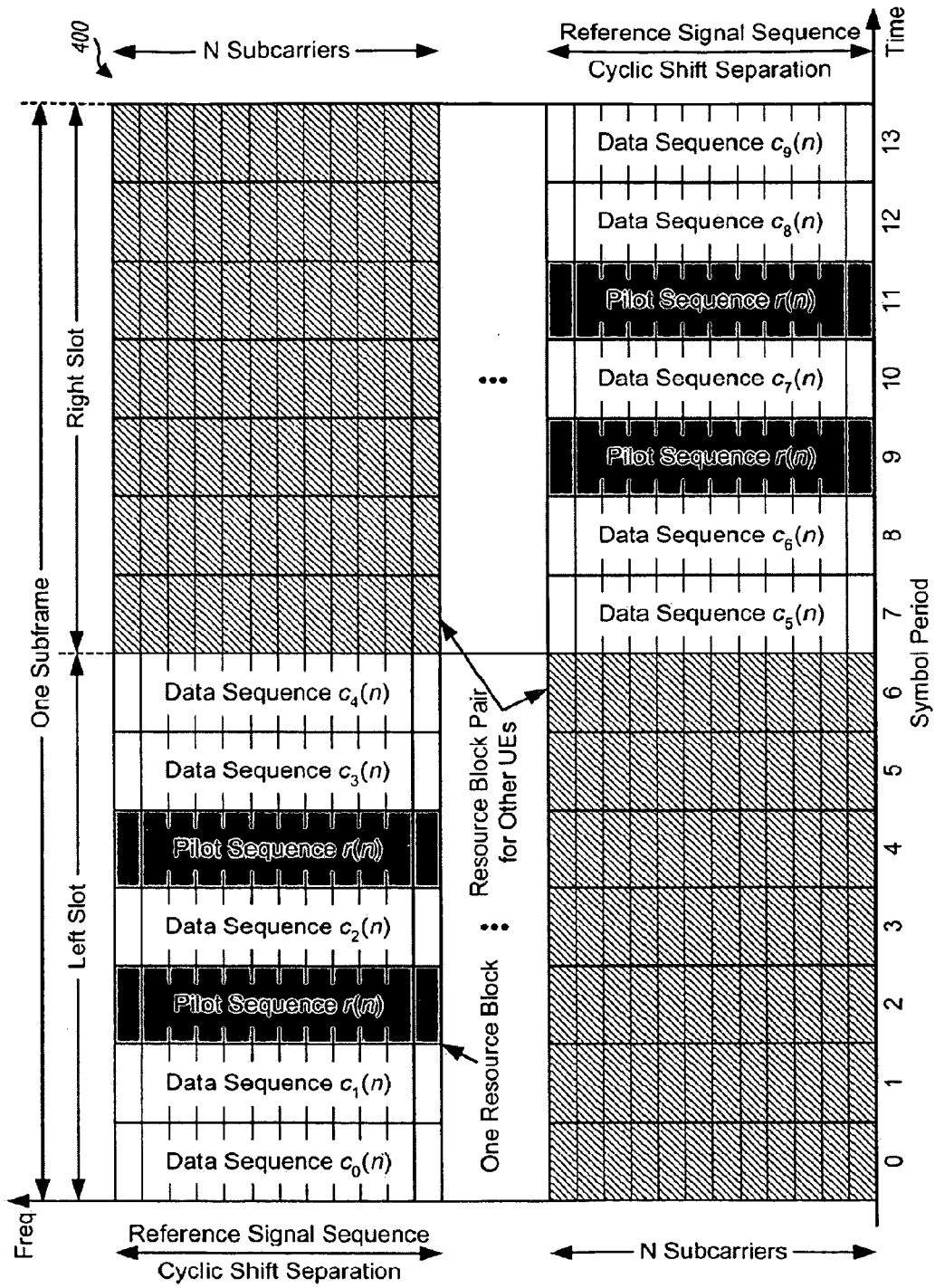
FIG. 4 shows a design of a CQI structure.

FIG. 4 shows a design of a CQI structure 400 for a case in which each slot includes seven symbol periods. In this design, a resource block for CQI includes five symbol periods for data and two symbol periods for pilot. In the design shown in FIG. 4, for the left slot, pilot is sent in two symbol periods 2 and 4 that are separated by one symbol period, and data is sent in the remaining five symbol periods 0, 1, 3, 5 and 6. Data and pilot for CQI may also be sent in other symbol periods within the resource block. It may be desirable to separate the two symbol periods for pilot by at least one symbol period (e.g., by one, two, or three symbol periods) in order to capture time variation in a wireless channel.

In one design, the reference signal sequences may be used directly as pilot sequences for CQI. A UE may send its reference signal sequence in each symbol period for pilot, without spreading. If six reference signal sequences are available, then up to six UEs may concurrently send pilots with the six reference signal sequences. Each UE may send its pilot with a specific reference signal sequence. The pilots from these UEs may be distinguished by separation of the reference signal sequences in the frequency domain.

In one design, a UE may process data for CQI as follows. The UE may first encode the information bits for CQI to obtain code bits and may map these code bits to ten modulation symbols d(0) through d(9). The UE may then modulate its reference signal sequence r(n) with each modulation symbol d(m), as follows:

$$c_m(n)=d(m) \cdot r(n), \text{for } n=0,\ldots,N-1 \text{ and } n=Q,\ldots,9, \quad \text{Eq (11)}$$

where $c_m(n)$ is a data sequence for CQI for symbol period nm. Ten data sequences $c_0(n)$ to $c_9(n)$ may be obtained for the ten modulation symbols d(0) through d(9), respectively, and may be sent in ten symbol periods for data in one resource block pair, e.g., as shown in FIG. 4.

In one design, six CQI channels may be defined with six reference signal sequences. Each CQI channel may be associated with a specific reference signal sequence r(n). Up to six UEs may concurrently send data and pilot for CQI on up to six CQI channels on the same resource block pair. The data and pilot from these UEs may be distinguished by the separation of the reference signal sequences in the frequency domain.

In one design of a CQI structure for slots with six symbol periods, a resource block for CQI includes four symbol periods for data and two symbol periods for pilot. For example, pilot may be sent in two symbol periods 1 and 4, and data may be sent in the remaining four symbol periods 0, 2, 3 and 5. In another design, a resource block for CQI includes five symbol periods for data and one symbol period for pilot. For example, pilot may be sent in one symbol period 2 or 3, and data may be sent in the remaining five symbol periods. Data and pilot for CQI may also be sent in other symbol periods within the resource block for the case with six symbol periods per slot.

FIGS. 3A and 3B show two example designs for sending data and pilot for ACK. FIG. 4 shows an example design for sending data and pilot for CQI. Data and pilot for ACK and CQI may also be sent in other manners, e.g., in different numbers of symbol periods, different symbol periods within a resource block, etc.

The ACK and CQI channels may also be multiplexed on the same resource block. Modulating an entire reference signal sequence with a modulation symbol (e.g., for ACK or CQI information) or a symbol of an orthogonal sequence (e.g., for pilot) does not change the correlation properties of the reference signal sequences. For the designs shown in FIGS. 3A and 4 and with six reference signal sequences, a single resource block pair may support one of the following configurations: 18 ACK channels, 1 CQI channel and 15 ACK channels, 2 CQI channels and 12 ACK channels, 3 CQI channels and 9 ACK channels, 4 CQI channels and 6 ACK channels, 5 CQI channels and 3 ACK channels, or 6 CQI channels.

Figure 5:
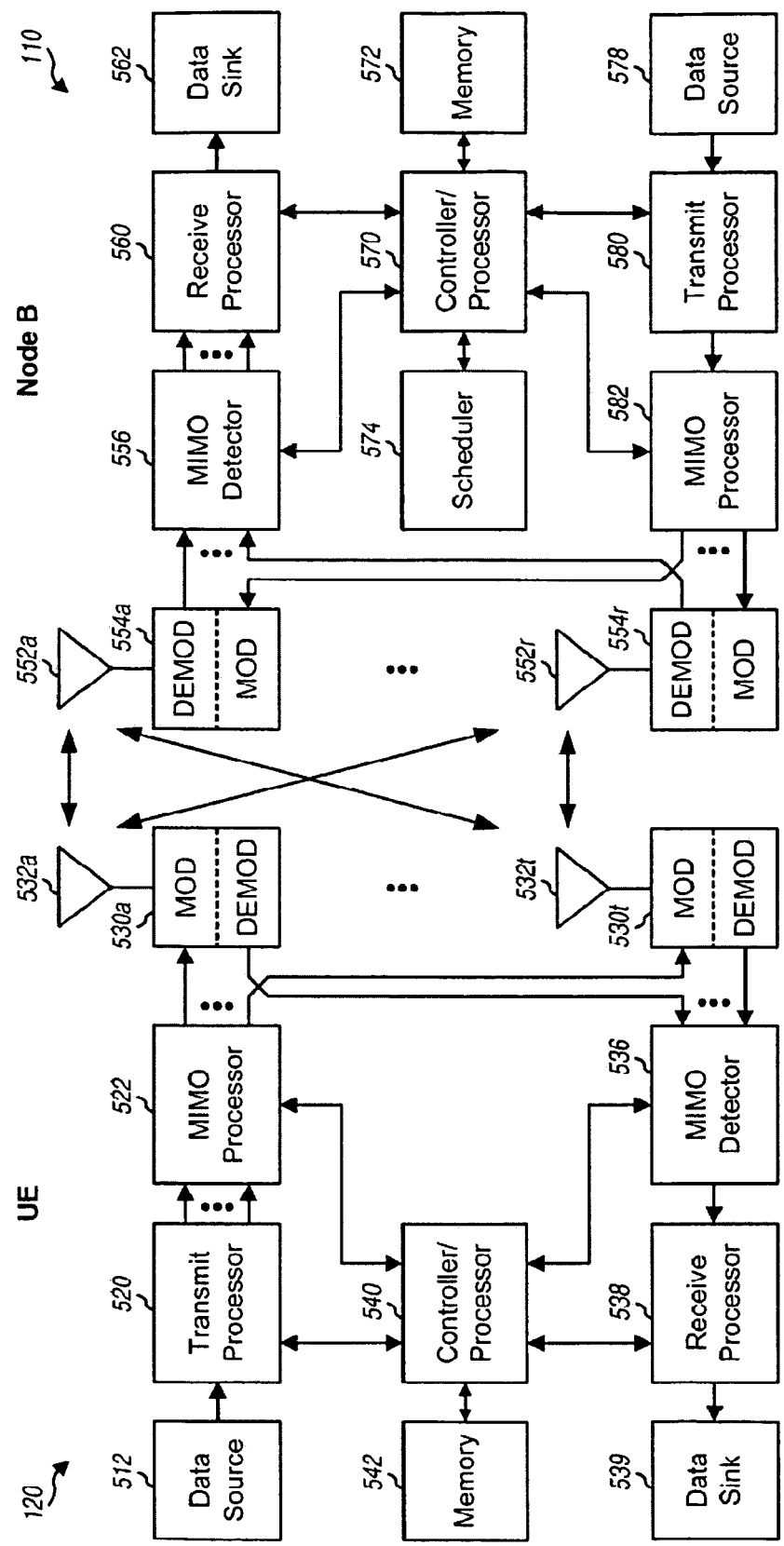
FIG. 5 shows a block diagram of a Node B and a UE.

FIG. 5 shows a block diagram of a design of a Node B 110 and a UE 120, which are one of the Node Bs and one of the UEs in FIG. 1. In this design, UE 120 is equipped with T antennas 532a through 532t, and Node B 110 is equipped with R antennas 552a through 552r, where in general T≥1 and R≥1.

At UE 120, a transmit processor 520 may receive traffic data from a data source 512, process (e.g., encode and symbol map) the traffic data, and provide data symbols. Transmit processor 520 may also receive control information (e.g., ACK and/or CQI information) from a controller/processor 540, process the control information as described above, and provide control symbols (e.g., for data sequences). Transmit processor 520 may also generate pilot symbols (e.g., for pilot sequences) and multiplex the pilot symbols with the data symbols and control symbols. A data symbol is a symbol for traffic data, a control symbol is a symbol for control information, a pilot symbol is a symbol for pilot, and a symbol may be a real or complex value. A pilot symbol may also be referred to as a reference symbol.

A MIMO processor 522 may process (e.g., precode) the symbols from transmit processor 520 and provide T output symbol streams to T modulators (MOD)) 530a through 530t. MIMO processor 522 may be omitted if UE 120 is equipped with a single antenna. Each modulator 530 may process its output symbol stream (e.g., for single-carrier frequency division multiplexing (SC-FDM)) to obtain an output sample stream. Each modulator 530 may further condition (e.g., convert to analog, filter, amplify, and upconvert) its output sample stream to generate an uplink signal. T uplink signals from modulators 530a through 530t may be transmitted via T antennas 532a through 532t, respectively.

At Node B 110, antennas 552a through 552r may receive the uplink signals from UE 120 and/or other UEs. Each antenna 552 may provide a received signal to a respective demodulator (DEMOD) 554. Each demodulator 554 may condition (e.g., filter, amplify, downconvert, and digitize) its received signal to obtain samples and may further process the samples (e.g., for SC-FDM) to obtain received symbols. A MIMO detector 556 may perform MIMO detection on the received symbols from all R demodulators 554a through 554r and provide detected symbols. A receive processor 560 may process (e.g., demodulate and decode) the detected symbols, provide decoded traffic data to a data sink 562, and provide decoded control information to a controller/processor 570. In general, the processing by MIMO detector 556 and receive processor 560 is complementary to the processing by MIMO processor 522 and transmit processor 520, respectively, at UE 120.

Node B 110 may transmit traffic data and/or control information on the downlink to UE 120. Traffic data from a data source 578 and/or control information from controller/processor 570 may be processed by a transmit processor 580 and further processed by a MIMO processor 582 to obtain R output symbol streams. R modulators 554a through 554r may process the R output symbol streams (e.g., for OFDM) to obtain R output: sample streams and may fiber condition the output sample streams to obtain R downlink signals, which may be transmitted via R antennas 552a through 552r. At UE 120, the downlink signals from Node B 110 may be received by antennas 532a through 532t, conditioned and processed by demodulators 530a through 530t, and farther processed by a MIMO detector 536 (if applicable) and a receive processor 538 to recover the traffic data and control information sent to UE 120. Receive processor 538 may provide the traffic data to a data sink 539 and provide the control information to controller/processor 540.

Controllers/processors 540 and 570 may direct the operation at UE 120 and Node B 110, respectively. Memories 542 and 572 may store data and program codes for UE 120 and Node B 110, respectively. A scheduler 574 may schedule UEs for data transmission on the downlink and/or uplink and may assign resources to the scheduled UEs. Scheduler 574 may also assign ACK and CQI resources to the UEs for transmission of ACK and CQI information. The ACK and CQI resources may comprise resource blocks, reference signal sequences, orthogonal sequences for pilot, orthogonal sequences for data, etc.

Figure 6:
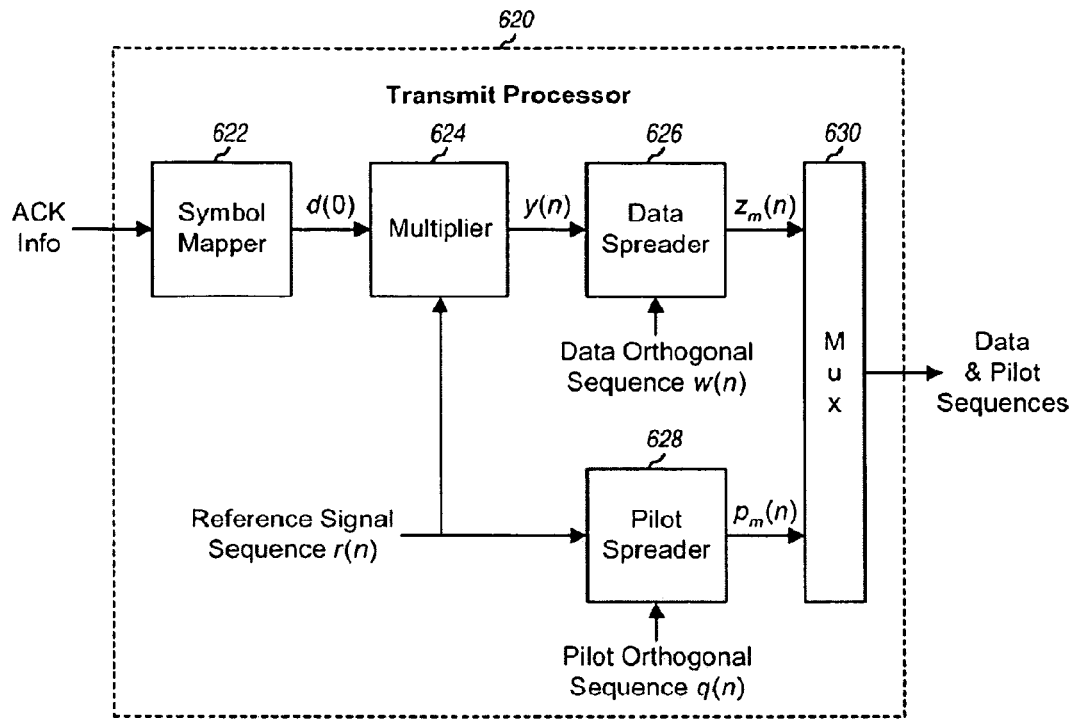
FIG. 6 shows a block diagram of a transmit processor for ACK.

FIG. 6 shows a block diagram of a design of a transmit processor 620 for ACK, which may be part of transmit processor 520 at UE 120 in FIG. 5. Within transmit processor 620, a symbol mapper 622 may map ACK information to a modulation symbol d(0). A multiplier 624 may multiply a reference signal sequence r(n) with the modulation symbol and provide a modulated sequence y(n), e.g., as shown in equation (7). A data spreader 626 may spread the modulated sequence with an orthogonal sequence w(m) for data and provide data sequences $z_m(n)$, e.g., as shown in equation (8). A pilot spreader 628 may spread the reference signal sequence with an orthogonal sequence q(m) for pilot and provide pilot sequences $p_m(n)$, e.g., as shown in equation (4). A multiplexer (Mux) 630 may receive the data sequences from spreader 626 and the pilot sequences from spreader 628 and may provide each sequence in a proper symbol period, e.g., as shown in FIG. 3A or 3B.

Figure 7:
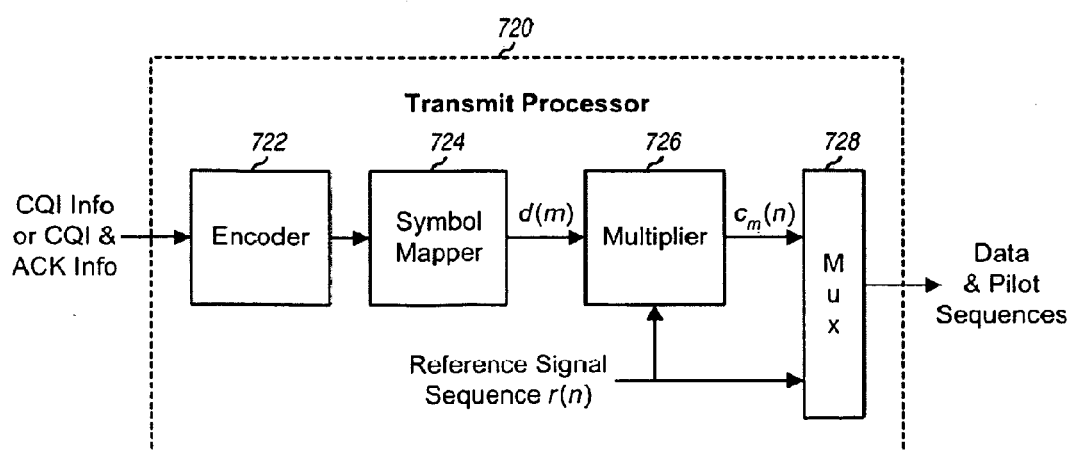
FIG. 7 shows a block diagram of a transmit processor for CQI.

FIG. 7 shows a block diagram of a design of a transmit processor 720 for CQI, which may be part of transmit processor 520 at UE 120 in FIG. 5. Within transmit processor 720, an encoder 722 may encode only CQI information or both CQI and ACK information to obtain code bits. A symbol mapper 724 may map the code bits to modulation symbols d(m). A multiplier 726 may multiply a reference signal sequence r(n) with each modulation symbol and provide a corresponding data sequence $c_m(n)$, e.g., as shown in equation (11). A multiplexer 728 may receive the data sequences from multiplier 726 and the reference signal sequence, provide each data sequence in a respective symbol period for data, and provide the reference signal sequence as a pilot sequence in each symbol period for pilot, e.g., as shown in FIG. 4.

FIG. 8 shows a design of an SC-FDM modulator 830, which may be used for each of modulators 530a through 530t at UE 120 in FIG. 5 when sending ACK or CQI. Within SC-FDM modulator 830, a DFT unit 832 may receive a data or pilot sequence containing N symbols for one symbol period, perform an N-point DFT on the N symbols, and provide N frequency-domain values. A symbol-to-subcarrier mapper 834 may map the N frequency-domain values to N subcarriers in a resource block used for ACK or CQI and may map zero values to remaining subcarriers. An inverse fast Fourier transform (IFFT) unit 836 may perform a K-point IFFT on tile K mapped values for the K total subcarriers and provide K time-domain samples for a useful portion. A cyclic prefix generator 838 may copy the last C samples of the useful portion and append these C samples to the front of the useful portion to form an SC-FDM symbol containing K+C samples. The SC-FDM symbol may be sent in one symbol period, which may include K+C simple periods.

FIG. 9 shows a block diagram of a design of an SC-FDM demodulator 950, which may be used for each of demodulators 554a through 554r at Node B 110 in FIG. 5 when receiving ACK or CQI. Within SC-FDM demodulator 950, a cyclic prefix removal unit 952 may obtain K+C received samples in each symbol period, remove C received samples corresponding to the cyclic prefix, and provide K received samples for the useful portion. A fast Fourier transform (FFT) unit 954 may perform a K-point FFT on the K received samples and provide K frequency-domain values for the K total subcarriers. A symbol-to-subcarrier demapper 956 may provide N frequency-domain values from the N subcarriers in a resource block assigned to UE 120 and may discard the remaining frequency-domain values. An IDFT unit 958 may perform an N-point IDFT on the N frequency-domain values and provide N received symbols for a received data or pilot sequence.

FIG. 10 shows a block diagram of a design of a receive processor 1060 for ACK, which may be part of receive processor 560 at Node B 110 in FIG. 5. Within receive processor 1060, a demultiplexer (Demux) 1062 may obtain received data and pilot sequences for ACK from a resource block pair assigned to UE 120, provide the received pilot sequences to a pilot despreader 1064, and provide the received data sequences to a coherent detector 1070. Pilot despreader 1064 may despread the received pilot sequences for each resource block with the orthogonal sequence q(m) assigned to UE 120 and provide a despread pilot sequence for that resource block. In one design, the pilot despreading for each resource block may be performed as follows:

$$\hat{r}(n) = \sum_{m=0}^{M-1} q^*(m) \cdot \tilde{p}_m(n),  \quad \text{Eq (12)}$$

where $\tilde{p}_m(n)$ is a received pilot sequence for symbol period m, and $\hat{r}(n)$ is a despread pilot sequence.

A channel estimator 1066 may derive a channel estimate for the N subcarriers in each resource block based on the despread pilot sequence for that resource block. Coherent detector 1070 may perform coherent detection for each received data sequence with an applicable channel estimate and provide a corresponding detected data sequence. A data despreader 1072 may despread the detected data sequences for each resource block with the orthogonal sequence w(m) assigned to UE 120 to obtain a despread data sequence for that resource block. In one design, the data despreading for each resource block may be performed as follows:

$$\hat{y}(n) = \sum_{m=0}^{L-1} w^*(m) \cdot b_m(n), \quad \text{Eq (13)}$$

where $b_m(n)$ is a detected data sequence for symbol period in, and $\hat{y}(n)$ is a despread data sequence, which is an estimate of y(n) in equation (7).

A correlator 1074 may correlate the despread data sequence for each resource block with each of the possible reference signal sequences and may provide the correlation result for the best reference signal sequence. A symbol demapper 1076 may obtain correlation results for the two resource blocks used for ACK, determine the modulation symbol most likely to have been sent by UE 120 based on the correlation results, and provide received ACK information for the UE.

FIG. 11 shows a block diagram of a design of a receive processor 1160 for CQI, which may be part of receive processor 560 at Node B 110 in FIG. 5. Within receive processor 1160, a demultiplexer 1162 may obtain received data and pilot sequences for CQI from a resource block pair assigned to UE 120, provide each received pilot sequence to a channel estimator 1164, and provide each received data sequence to a coherent detector 1170. Channel estimator 1164 may derive one or more channel estimates for the N subcarriers in each resource block based on die received pilot sequences for that resource block. In one design, channel estimator 1164 may derive a channel estimate for each resource block based on all received pilot sequences for that resource block. This design may be used for a slow varying channel, e.g., low mobility. In another design, channel estimator 1164 may derive a channel estimate for each symbol period in each resource block based on (e.g., by interpolating) the received pilot sequences for that resource block. This design may be used for a fast varying channel, e.g., high mobility.

Coherent detector 1170 may perform coherent detection for each received data sequence with an applicable channel estimate and provide a corresponding detected data sequence. A correlator 1172 may correlate each detected data sequence with each of the possible reference signal sequences and provide correlation result for the best reference signal sequence. A unit 1174 may compute log-likelihood ratios (LLRs) based on the correlation results for the detected data sequences. A decoder 1176 may decode the LLRs for all data sequences and provide received CQI information for UE 120.

FIGS. 10 and 11 show example designs of the processing by Node B 110 to recover ACK and CQI information sent by UE 120. Node B 110 may also perform processing for ACK and CQI in other manners. For example, correlator 1074 in FIG. 10 and correlator 1172 in FIG. 11 may each be replaced with a detector that can detect for the reference signal sequence assigned to UE 120. The processing may also be performed in different orders than the order shown in FIGS. 10 and 11. Node B 110 may perform processing in the time domain (e.g., as shown in FIGS. 10 and 11) on time-domain received data and pilot sequences provided by IDFT unit 958 in FIG. 9. Alternatively, Node B 110 may perform processing in the frequency domain on frequency-domain received data and pilot sequences provided by demapper 956 in FIG. 9.

Node B 110 may receive data and pilot sequences from UE 120 via multiple antennas 552a through 552r. In this case, Node B 110 may combine results from the multiple antennas, e.g., after coherent detector 1070 or after data despreader 1072 in FIG. 10, and after coherent detector 1170 in FIG. 11. Node B 110 may also combine across multiple antennas at other points in the processing paths for ACK and CQI.

Figures 12, 13:
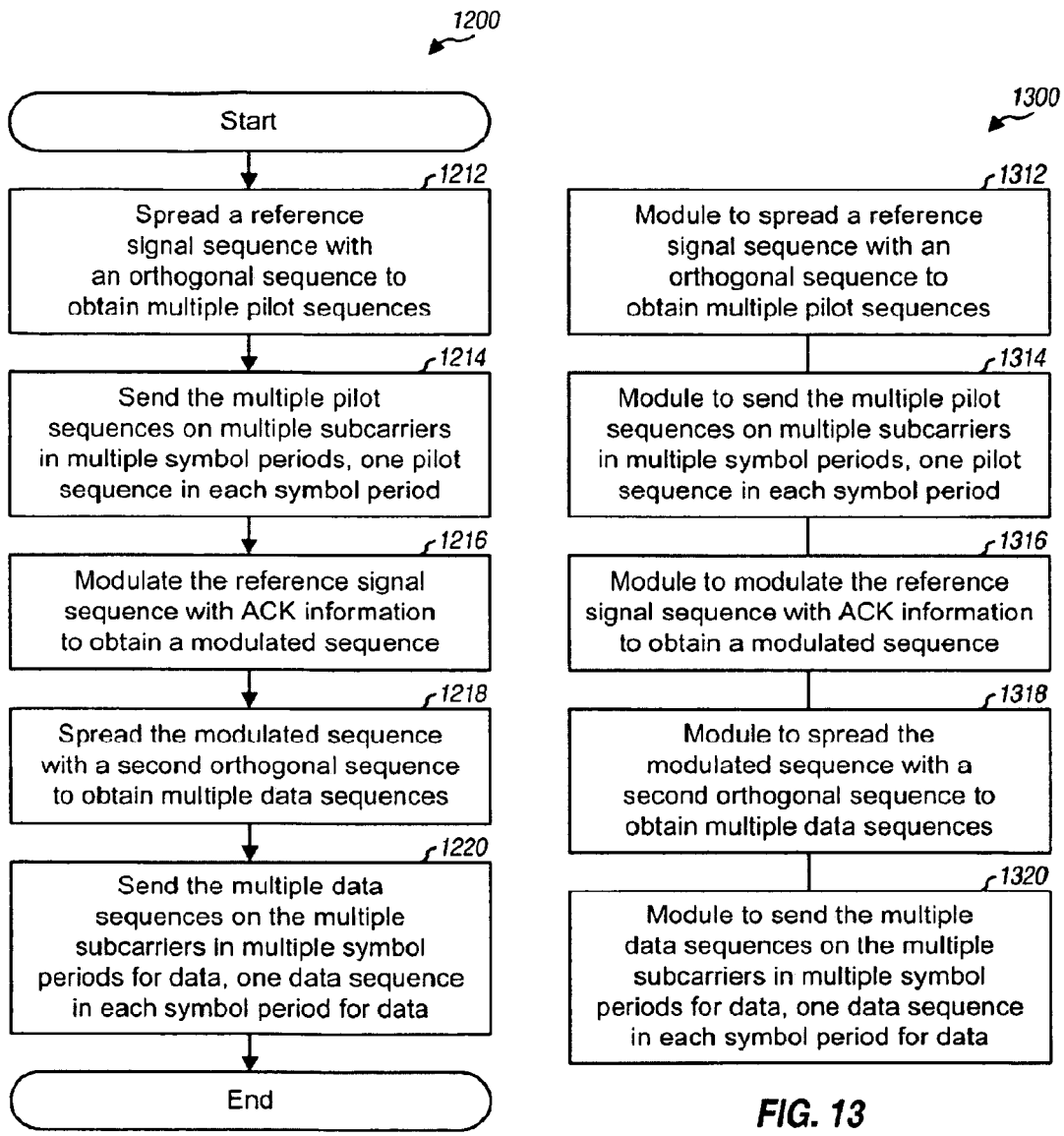
FIG. 12 shows a process for transmitting data and pilot for ACK.
FIG. 13 shows an apparatus for transmitting data and pilot for ACK.

FIG. 12 shows a design of a-process 1200 for transmitting data and pilot for ACK. Process 1200 may be performed by a UE or some other entity. The UE may be assigned a reference signal sequence selected from a set of reference signal sequences generated based on different cyclic shifts of a base sequence. The UE may also be assigned an orthogonal sequence selected from a set of orthogonal sequences generated based on a DFT matrix or a Walsh matrix. The UE may spread the reference signal sequence with the orthogonal sequence to obtain multiple pilot sequences (block 1212). The UE may then send the multiple pilot sequences on multiple (e.g., 12) subcarriers in multiple symbol periods, one pilot sequence in each symbol period, with each pilot sequence being sent on the multiple subcarriers (block 1214). The multiple symbol periods may be consecutive symbol periods in a resource block.

In one design, the UE may spread the reference signal sequence with an orthogonal sequence of length three to obtain three pilot sequences. The UE may then send the three pilot sequences in the middle three symbol periods of a slot comprising seven symbol periods, e.g., as shown in FIG. 3A. In another design, the UE may spread the reference signal sequence with an orthogonal sequence of length two to obtain two pilot sequences. The UE may then send the two pilot sequences in the middle two symbol periods of a slot comprising six symbol periods, e.g., as shown in FIG. 33.

The UE may be assigned a second orthogonal sequence selected from a set of orthogonal sequences generated based on a DFT matrix or a Walsh matrix. The UE may modulate the reference signal sequence with ACK information to obtain a modulated sequence (block 1216). The UE may then spread the modulated sequence with the second orthogonal sequence to obtain multiple data sequences (block 1218). The UE may send the multiple data sequences on the multiple subcarriers in multiple symbol periods for data, one data sequence in each symbol period for data, with each data sequence being sent on the multiple subcarriers (block 1220). In one design, the UE may spread the modulated sequence with an orthogonal sequence of length four to obtain four data sequences. The UE may then send the four data sequences in four symbol periods of a slot, e.g., as shown in FIG. 3A or 3B.

In one design, the UE may generate multiple SC-FDM symbols based on the multiple pilot sequences, one SC-FDM symbol for each pilot sequence. The UE may also generate multiple SC-FDM symbols based on the multiple data sequences, one SC-FDM symbol for each data sequence. The UE may send each SC-FDM symbol in a different symbol period.

FIG. 13 shows a design of an apparatus 1300 for transmitting data and pilot for ACK. Apparatus 1300 includes a module 1312 to spread a reference signal sequence with an orthogonal sequence to obtain multiple pilot sequences, a module 1314 to send the multiple pilot sequences on multiple subcarriers in multiple symbol periods, one pilot sequence in each symbol period, a module 1316 to modulate the reference signal sequence with ACK information to obtain a modulated sequence, a module 1318 to spread the modulated sequence with a second orthogonal sequence to obtain multiple data sequences, and a module 1320 to send the multiple data sequences on the multiple subcarriers in multiple symbol periods for data, one data sequence in each symbol period for data.

FIG. 14 shows a design of a process 1400 for transmitting data and pilot for CQI. Process 1400 may be performed by a UE or some other entity. The UE may be assigned a reference signal sequence selected from a set of reference signal sequences generated based on different cyclic shifts of a base sequence. The UE may generate multiple pilot sequences based on the reference signal sequence (block 1412). In one design, the UE may set each pilot sequence equal to the reference signal sequence. The UE may also generate the pilot sequences based on the reference signal sequence in other manners. The UE may send the multiple pilot sequences on multiple subcarriers in multiple symbol periods separated by at least one symbol period, one pilot sequence in each symbol period, with each pilot sequence being sent on the multiple subcarriers (block 1414).

The UE may generate multiple modulation symbols based on CQI information or both CQI and ACK information (block 1416). The UE may modulate the reference signal sequence with the multiple modulation symbols to obtain multiple data sequences (block 1418). The UE may send the multiple data sequences on the multiple subcarriers in multiple symbol periods for data, one data sequence in each symbol period for data, with each data sequence being sent on the multiple subcarriers (block 1420).

In one design, the UE may generate two pilot sequences based on the reference signal sequence and may send these two pilot sequences in two symbol periods in each of two slots. Each slot may include seven symbol periods, and the two symbol periods for pilot may be separated by at least one symbol period. The UE may generate ten data sequences based on the reference signal sequence and ten modulation symbols and may send these ten data sequences in the remaining ten symbol periods in the two slots. The UE may also generate and send different members of pilot sequences and data sequences.

FIG. 15 shows a design of an apparatus 1500 for transmitting data and pilot for CQI. Apparatus 1500 includes a module 1512 to generate multiple pilot sequences based on a reference signal sequence, a module 1514 to send the multiple pilot sequences on multiple subcarriers in multiple symbol periods separated by at least one symbol period, one pilot sequence in each symbol period, a module 1516 to generate multiple modulation symbols based on CQI information or both CQI and ACK information, a module 1518 to modulate the reference signal sequence with the multiple modulation symbols to obtain multiple data sequences, and a module 1520 to send the multiple data sequences on the multiple subcarriers in multiple symbol periods for data, one data sequence in each symbol period for data.

FIG. 16 shows a design of a process 1600 for receiving ACK. Process 1600 may be performed by a Node B or some other entity. The Node B may receive multiple (e.g., two or three) pilot sequences on multiple subcarriers in multiple symbol periods from a UE, one pilot sequence in each symbol period (block 1612). The Node B may despread the multiple pilot sequences with an orthogonal sequence (e.g., of length 2 or 3) to obtain a despread pilot sequence (block 1614). The Node B may derive a channel estimate based on the despread pilot sequence (block 1616). The Node B may perform the despreading and channel estimation in the time domain or the frequency domain.

The Node B may also receive multiple (e.g., four) data sequences on the multiple subcarriers in multiple symbol periods for data, one data sequence in each symbol period for data (block 1618). The Node B may perform coherent detection for the multiple data sequences with the channel estimate to obtain multiple detected data sequences (block 1620). The Node B may despread the multiple detected data sequences with a second orthogonal sequence (e.g., of length 4) to obtain a despread data sequence (block 1622). The Node B may then recover ACK information from the UE based on the despread data sequence (block 1624).

FIG. 17 shows a design of an apparatus 1700 for receiving ACK. Apparatus 1700 includes a module 1712 to receive multiple pilot sequences on multiple subcarriers in multiple symbol periods from a UE, one pilot sequence in each symbol period, a module 1714 to despread the multiple pilot sequences with an orthogonal sequence to obtain a despread pilot sequence, a module 1716 to derive a channel estimate based on the despread pilot sequence, a module 1718 to receive multiple data sequences on the multiple subcarriers in multiple symbol periods for data, one data sequence in each symbol period for data, a module 1720 to perform coherent detection for the multiple data sequences with the channel estimate to obtain multiple detected data sequences, a module 1722 to despread the multiple detected data sequences with a second orthogonal sequence to obtain a despread data sequence, and a module 1724 to recover ACK information from the UE based on the despread data sequence.

FIG. 18 shows a design of a process 1800 for receiving CQI. Process 1800 may be performed by a Node B or some other entity. The Node B may receive multiple (e.g., two) pilot sequences on multiple subcarriers in multiple symbol periods separated by at least one symbol period from a UE, one pilot sequence in each symbol period (block 1812). The Node B may derive a channel estimate based on the multiple pilot sequences (block 1814). The Node B may also receive multiple data sequences on the multiple subcarriers in multiple symbol periods for data, one data sequence in each symbol period for data (block 1816). The Node B may perform coherent detection for the multiple data sequences with the channel estimate to obtain multiple detected data sequences (block 1818). The Node B may then recover CQI information or both CQI and ACK information from the UE based on the multiple detected data sequences (block 1820).

FIG. 19 shows a design of an apparatus 1900 for receiving CQI. Apparatus 1900 includes a module 1912 to receive multiple pilot sequences on multiple subcarriers in multiple symbol periods separated by at least one symbol, period from a UE, one pilot sequence in each symbol period, a module 1914 to derive a channel estimate based on the multiple pilot sequences, a module 1916 to receive multiple data sequences on the multiple subcarriers in multiple symbol periods for data, one data sequence in each symbol period for data, a module 1918 to perform coherent detection for the multiple data sequences with the channel estimate to obtain multiple detected data sequences, and a module 1920 to recover CQI information or both CQI and ACK information from the UE based on the multiple detected data sequences.

FIG. 20 shows a design of a process 2000 for supporting transmission of ACK and CQI by UEs. Process 2000 may be performed by a Node B or some other network entity. The Node B may select first and second orthogonal sequences from a set of orthogonal sequences generated based on a DFT matrix (block 2012). The Node B may select first and second reference signal sequences from a set of reference signal sequences generated based on different cyclic shifts of a base sequence (block 2014). The Node B may assign the first reference signal sequence and the first orthogonal sequence to a first UE for sending pilot (block 2016). The Node B may assign the second reference signal sequence and the second orthogonal sequence to a second UE for sending pilot (block 2018). The Node B may thereafter receive a first set of pilot sequences from the first UE on multiple subcarriers in multiple symbol periods (block 2020). The first set of pilot sequences may be generated by the first UE based on the first reference signal sequence and the first orthogonal sequence. The Node B may also receive a second set of pilot sequences from the second UE on the multiple subcarriers in the multiple symbol periods (block 2022). The second set of pilot sequences may be generated by the second UE based on the second reference signal sequence and the second orthogonal sequence.

The Node B may also assign the first reference signal sequence and the second orthogonal sequence to a third UE for sending pilot. The Node B may further assign the second reference signal sequence and the first orthogonal sequence to a fourth UE for sending pilot. In general, each UE may be assigned a different combination of reference signal sequence and orthogonal sequence for sending pilot on the same resource block.

The Node B may select third and fourth orthogonal sequences from a set of orthogonal sequences generated based on a Walsh matrix. The Node B may assign the third orthogonal sequence to the first UE for sending data and may assign the fourth orthogonal sequence to the second UE for sending data. The Node B may thereafter receive a first set of data sequences from the first UE on the multiple subcarriers in multiple symbol periods for data. The first set of data sequences may be generated by the first UE based on the first reference signal sequence and the third orthogonal sequence. The Node B may receive a second set of data sequences from the second UE on the multiple subcarriers in the multiple symbol periods for data. The second set of data sequences may be generated by the second UE based on the second reference signal sequence and the fourth orthogonal sequence.

FIG. 21 shows a design of an apparatus 2100 for supporting transmission of ACK and CQI by UEs. Apparatus 2100 includes a module 2112 to select first and second orthogonal sequences from a set of orthogonal sequences generated based on a DFT matrix, a module 2114 to select first and second reference signal sequences from a set of reference signal sequences generated based on different cyclic shifts of a base sequence, a module 2116 to assign the first reference signal sequence aid the first orthogonal sequence to a first OF for sending pilot, a module 2118 to assign the second reference signal sequence and the second orthogonal sequence to a second UE for sending pilot, a module 2120 to receive a first set of pilot sequences from the first LYE on multiple subcarriers in multiple symbol periods, and a module 2122 to receive a second set of pilot sequences from the second UE on the multiple subcarriers in the multiple symbol periods.

The modules in FIGS. 13, 15, 17, 19 and 21 may comprise processors, electronics devices, hardware devices, electronics components, logical circuits, memories, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    spreading a reference signal sequence with an orthogonal sequence to obtain multiple pilot sequences;
    sending the multiple pilot sequences on multiple subcarriers in multiple symbol periods, each pilot sequence in a different symbol period, each pilot sequence being sent on the multiple subcarriers;
    modulating the reference signal sequence with acknowledgement (ACK) information to obtain a modulated sequence;
    spreading the modulated sequence with a second orthogonal sequence to obtain multiple data sequences; and
    sending the multiple data sequences on the multiple subcarriers in multiple symbol periods for data, one data sequence in each symbol period for data, each data sequence being sent on the multiple subcarriers.

2. The method of claim 1, further comprising:
obtaining the orthogonal sequence from a first set of orthogonal sequences generated based on a discrete Fourier transform (DFT) matrix; and
obtaining the second orthogonal sequence from a second set of orthogonal sequences generated based on a Walsh matrix.

3. The method of claim 1,
wherein the reference signal sequence is spread with the orthogonal sequence of length three to obtain three pilot sequences sent in middle three symbol periods of a slot comprising seven symbol periods, and wherein the modulated sequence is spread with the second orthogonal sequence of length four to obtain four data sequences sent in remaining four symbol periods of the slot.

4. An apparatus for wireless communication, comprising:
at least one processor configured to spread a reference signal sequence with an orthogonal sequence to obtain multiple pilot sequences, and to send the multiple pilot sequences on multiple subcarriers in multiple symbol periods, each pilot sequence in a different symbol period, each pilot sequence being sent on the multiple subcarriers,
wherein the at least one processor is configured to modulate the reference signal sequence with acknowledgement (ACK) information to obtain a modulated sequence, to spread the modulated sequence with a second orthogonal sequence to obtain multiple data sequences, and to send the multiple data sequences on the multiple subcarriers in multiple symbol periods for data, each data sequence in each symbol period for data, each data sequence being sent on the multiple subcarriers.

5. An apparatus for wireless communication, comprising:
means for spreading a reference signal sequence with an orthogonal sequence to obtain multiple pilot sequences;
means for sending the multiple pilot sequences on multiple subcarriers in multiple symbol periods, each pilot sequence in a different symbol period, each pilot sequence being sent on the multiple subcarriers;
means for modulating the reference signal sequence with acknowledgement (ACK) information to obtain a modulated sequence;
means for spreading the modulated sequence with a second orthogonal sequence to obtain multiple data sequences; and
means for sending the multiple data sequences on the multiple subcarriers in multiple symbol periods for data, one data sequence in each symbol period for data, each data sequence being sent on the multiple subcarriers.

6. A method for wireless communication, comprising:
generating multiple pilot sequences based on a reference signal sequence;
sending the multiple pilot sequences on multiple subcarriers in multiple symbol periods separated by at least one symbol period, each pilot sequence in a different symbol period, each pilot sequence being sent on the multiple subcarriers;
generating multiple modulation symbols based on channel quality indicator (CQI) information or both CQI and acknowledgement (ACK) information;
modulating the reference signal sequence with the multiple modulation symbols to obtain multiple data sequences; and
sending the multiple data sequences on the multiple subcarriers in multiple symbol periods for data, each data sequence in a different symbol period for data, each data sequence being sent on the multiple subcarriers.

7. The method of claim 6, wherein two pilot sequences are generated based on the reference signal sequence and sent in two symbol periods in each of two slots, each slot comprising seven symbol periods, and wherein ten data sequences are generated based on the reference signal sequence and ten modulation symbols and sent in remaining ten symbol periods in the two slots.

8. An apparatus for wireless communication, comprising:
at least one processor configured to generate multiple pilot sequences based on a reference signal sequence, to send the multiple pilot sequences on multiple subcarriers in multiple symbol periods separated by at least one symbol period, each pilot sequence in a different symbol period, each pilot sequence being sent on the multiple subcarriers, to generate multiple modulation symbols based on channel quality indicator (CQI) information or both CQI and acknowledgement (ACK) information, to modulate the reference signal sequence with the multiple modulation symbols to obtain multiple data sequences, and to send the multiple data sequences on the multiple subcarriers in multiple symbol periods from data, one data sequence in each symbol period for data, each data sequence being sent on the multiple subcarriers.

9. The apparatus of claim 8, wherein the at least one processor is configured to generate two pilot sequences based on the reference signal sequence, to send the two pilot sequences in two symbol periods in each of two slots, each slot comprising seven symbol periods, to generate ten modulation symbols based on the CQI information or both the CQI and ACK information, to generate ten data sequences based on the reference signal sequence and the ten modulation symbols, and to send the ten data sequences in remaining ten symbol periods in the two slots.

10. A method for wireless communication, comprising:
receiving multiple pilot sequences on multiple subcarriers in multiple symbol periods, each pilot sequence in a different symbol period;
despreading the multiple pilot sequences with an orthogonal sequence to obtain a despread pilot sequence;
deriving a channel estimate based on the despread pilot sequence;
receiving multiple data sequences on the multiple subcarriers in multiple symbol periods for data, one data sequence in each symbol period for data;
performing coherent detection for the multiple data sequences with the channel estimate to obtain multiple detected data sequences;
despreading the multiple detected data sequences with a second orthogonal sequence to obtain a despread data sequence; and
recovering acknowledgement (ACK) information based on the despread data sequence.

11. An apparatus for wireless communication, comprising:
at least one processor configured to receive multiple pilot sequences on multiple subcarriers in multiple symbol periods, each pilot sequence in a different symbol period, to despread the multiple pilot sequences with an orthogonal sequence to obtain a despread pilot sequence, and to derive a channel estimate based on the despread pilot sequence,
wherein the at least one processor is configured to receive multiple data sequences on the multiple subcarriers in multiple symbol periods for data, one data sequence in each symbol period for data, to perform coherent detection for the multiple data sequences with the channel estimate to obtain multiple detected data sequences, to despread the multiple detected data sequences with a second orthogonal sequence to obtain a despread data sequence, and to recover acknowledgement (ACK) information based on the despread data sequence.

12. A method for wireless communication, comprising:
receiving multiple pilot sequences on multiple subcarriers in multiple symbol periods separated by at least one symbol period, each pilot sequence in a different symbol period;
deriving a channel estimate based on the multiple pilot sequences;
receiving multiple data sequences on the multiple subcarriers in multiple symbol periods for data, one data sequence in each symbol period for data;
performing coherent detection for the multiple data sequences with the channel estimate to obtain multiple detected data sequences; and
recovering channel quality indicator (CQI) information or both CQI and acknowledgement (ACK) information based on the multiple detected data sequences.

13. The method of claim 12, wherein two pilot sequences are received in two symbol periods in each of two slots, each slot comprising seven symbol periods, wherein a channel estimate is derived for each slot based on the two pilot sequences received in the slot, wherein five data sequences are received in remaining five symbol periods of each slot, wherein coherent detection is performed for the five data sequences received in each slot with the channel estimate for the slot to obtain five detected data sequences for the slot, and wherein CQI information or both CQI and ACK information is recovered based on ten detected data sequences obtained for the two slots.

14. An apparatus for wireless communication, comprising:
at least one processor configured to receive multiple pilot sequences on multiple subcarriers in multiple symbol periods separated by at least one symbol period, each pilot sequence in a different symbol period, to derive a channel estimate based on the multiple pilot sequences, to receive multiple data sequences on the multiple subcarriers in multiple symbol periods for data, one data sequence in each symbol period for data, to perform coherent detection for the multiple data sequences with the channel estimate to obtain multiple detected data sequences, and to recover channel quality indicator (CQI) information or both CQI and acknowledgement (ACK) information based on the multiple detected data sequences.

15. A method for wireless communication, comprising:
selecting first and second orthogonal sequences from a set of orthogonal sequences generated based on a discrete Fourier transform (DFT) matrix;
selecting first and second reference signal sequences from a set of reference signal sequences generated based on different cyclic shifts of a base sequence;
assigning the first reference signal sequence and the first orthogonal sequence to a first user equipment (UE) for sending pilot sequences; and
assigning the second reference signal sequence and the second orthogonal sequence to a second UE for sending pilot sequences.

16. The method of claim 15, further comprising:
receiving a first set of pilot sequences from the first UE on multiple subcarriers in multiple symbol periods, the first set of pilot sequences being generated by the first UE based on the first reference signal sequence and the first orthogonal sequence; and
receiving a second set of pilot sequences from the second UE on the multiple subcarriers in the multiple symbol periods, the second set of pilot sequences being generated by the second UE based on the second reference signal sequence and the second orthogonal sequence.

17. The method of claim 15, further comprising:
assigning the first reference signal sequence and the second orthogonal sequence to a third UE for sending pilot sequences; and
assigning the second reference signal sequence and the first orthogonal sequence to a fourth UE for sending pilot sequences.

18. The method of claim 15, further comprising:
selecting third and fourth orthogonal sequences from a second set of orthogonal sequences generated based on a Walsh matrix;
assigning the third orthogonal sequence to the first UE for sending data; and
assigning the fourth orthogonal sequence to the second UE for sending data.

19. The method of claim 18, further comprising:
receiving a first set of data sequences from the first UE on multiple subcarriers in multiple symbol periods, the first set of data sequences being generated by the first UE based on the first reference signal sequence and the third orthogonal sequence; and
receiving a second set of data sequences from the second UE on the multiple subcarriers in the multiple symbol periods, the second set of data sequences being generated by the second UE based on the second reference signal sequence and the fourth orthogonal sequence.

20. An apparatus for wireless communication, comprising:
at least one processor configured to select first and second orthogonal sequences from a set of orthogonal sequences generated based on a discrete Fourier transform (DFT) matrix, to select first and second reference signal sequences from a set of reference signal sequences generated based on different cyclic shifts of a base sequence, to assign the first reference signal sequence and the first orthogonal sequence to a first user equipment (UE) for sending pilot sequences, and to assign the second reference signal sequence and the second orthogonal sequence to a second UE for sending pilot sequences.

21. The apparatus of claim 20, wherein the at least one processor is configured to select third and fourth orthogonal sequences from a second set of orthogonal sequences generated based on a Walsh matrix, to assign the third orthogonal sequence to the first UE for sending data, and to assign the fourth orthogonal sequence to the second UE for sending data.

22. An apparatus for wireless communication, comprising:
means for generating multiple pilot sequences based on a reference signal sequence;
means for sending the multiple pilot sequences on multiple subcarriers in multiple symbol periods separated by at least one symbol period, each pilot sequence in a different symbol period, each pilot sequence being sent on the multiple subcarriers;
means for generating multiple modulation symbols based on channel quality indicator (CQI) information or both CQI and acknowledgement (ACK) information;

means for modulating the reference signal sequence with the multiple modulation symbols to obtain multiple data sequences; and means for sending the multiple data sequences on the multiple subcarriers in multiple symbol periods for data, one data sequence in each symbol period for data, each data sequence being sent on the multiple subcarriers.

23. A computer program product, comprising:
a non-transitory computer-readable medium comprising:
   code for generating multiple pilot sequences based on a reference signal sequence;
   code for sending the multiple pilot sequences on multiple subcarriers in multiple symbol periods separated by at least one symbol period, each pilot sequence in a different symbol period, each pilot sequence being sent on the multiple subcarriers;
   code for generating multiple modulation symbols based on channel quality indicator (CQI) information or both CQI and acknowledgement (ACK) information;
   code for modulating the reference signal sequence with the multiple modulation symbols to obtain multiple data sequences; and
   code for sending the multiple data sequences on the multiple subcarriers in multiple symbol periods for data, one data sequence in each symbol periods for data, each data sequence being sent on the multiple subcarriers.

24. A computer program product, comprising:
a non-transitory computer-readable medium comprising:
   code for spreading a reference signal sequence with an orthogonal sequence to obtain multiple pilot sequences;
   code for sending the multiple pilot sequences on multiple subcarriers in multiple symbol periods, each pilot sequence in a different symbol period, each pilot sequence being sent on the multiple subcarriers;
   code for modulating the reference signal sequence with acknowledgement (ACK) information to obtain a modulated sequence;
   code for spreading the modulated sequence with a second orthogonal sequence to obtain multiple data sequences; and
   code for sending the multiple data sequences on the multiple subcarriers in multiple symbol periods for data, one data sequence in each symbol period for data, each data sequence being sent on the multiple subcarriers.

25. A computer program product, comprising:
a non-transitory computer-readable medium comprising:
   code for generating multiple pilot sequences based on a reference signal sequence;
   code for sending the multiple pilot sequences on multiple subcarriers in multiple symbol periods separated by at least one symbol period, each pilot sequence in a different symbol period, each pilot sequence being sent on the multiple subcarriers;
   code for generating multiple modulation symbols based on channel quality indicator (CQI) information or both CQI and acknowledgement (ACK) information;
   code for modulating the reference signal sequence with the multiple modulation symbols to obtain multiple data sequences; and
   code for sending the multiple data sequences on the multiple subcarriers in multiple symbol periods for data, each data sequence in a different symbol period for data, each data sequence being sent on the multiple subcarriers.

26. A computer program product, comprising:
a non-transitory computer-readable medium comprising:
   code for receiving multiple pilot sequences on multiple subcarriers in multiple symbol periods, each pilot sequence in a different symbol period;
   code for despreading the multiple pilot sequences with an orthogonal sequence to obtain a despread pilot sequence;
   code for deriving a channel estimate based on the despread pilot sequence;
   code for receiving multiple data sequences on the multiple subcarriers in multiple symbol periods for data, one data sequence in each symbol period for data;
   code for performing coherent detection for the multiple data sequences with the channel estimate to obtain multiple detected data sequences;
   code for despreading the multiple detected data sequences with a second orthogonal sequence to obtain a despread data sequence; and
   code for recovering acknowledgement (ACK) information based on the despread data sequence.

27. A computer program product, comprising:
a non-transitory computer-readable medium comprising:
   code for receiving multiple pilot sequences on multiple subcarriers in multiple symbol periods separated by at least one symbol period, each pilot sequence in a different symbol period;
   code for deriving a channel estimate based on the multiple pilot sequences;
   code for receiving multiple data sequences on the multiple subcarriers in multiple symbol periods for data, one data sequence in each symbol period for data;
   code for performing coherent detection for the multiple data sequences with the channel estimate to obtain multiple detected data sequences; and
   code for recovering channel quality indicator (CQI) information or both CQI and acknowledgement (ACK) information based on the multiple detected data sequences.

* * * * *